(12) United States Patent
Bachmat et al.

(10) Patent No.: US 6,711,649 B1
(45) Date of Patent: Mar. 23, 2004

(54) LOAD BALANCING ON DISK ARRAY STORAGE DEVICE

(75) Inventors: Eitan Bachmat, Lehavim (IL); Yuval Ofek, Framingham, MA (US); Avinoam Zakai, Cambridge, MA (US); Moshe Schreiber, Brookline, MA (US); Victoria Dubrovsky, Westboro, MA (US); Tao Kai Lam, Boston, MA (US); Ruben Michel, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/396,253

(22) Filed: Sep. 15, 1999

Related U.S. Application Data

(63) Continuation-in-part of application No. 09/143,683, filed on Aug. 28, 1998, now Pat. No. 6,189,071, which is a continuation-in-part of application No. 09/002,428, filed on Jan. 2, 1998, now Pat. No. 6,088,766, which is a continuation-in-part of application No. 08/944,606, filed on Oct. 6, 1997, now Pat. No. 6,061,761.

(51) Int. Cl.⁷ .............................................. G06F 12/02
(52) U.S. Cl. ........................ 711/114; 711/148; 711/167; 711/170; 710/18; 709/105
(58) Field of Search ................................ 711/114, 170, 711/148, 167, 111, 112; 710/18; 709/105

(56) References Cited

U.S. PATENT DOCUMENTS

| | | | |
|---|---|---|---|
| 3,702,006 A | | 10/1972 | Page ............................ 709/105 |
| 4,633,387 A | | 12/1986 | Hartug et al. ................ 709/105 |
| 5,239,649 A | | 8/1993 | McBride et al. ............. 709/105 |
| 5,974,515 A | * | 10/1999 | Bachmat et al. ............. 711/170 |
| 6,061,761 A | * | 5/2000 | Bachmat ...................... 711/114 |
| 6,088,766 A | * | 7/2000 | Bachmat et al. ............. 711/114 |
| 6,112,257 A | * | 8/2000 | Mason, Jr. et al. ........... 710/18 |
| 6,173,374 B1 | * | 1/2001 | Heil et al. .................... 711/148 |
| 6,189,071 B1 | * | 2/2001 | Bachmat ...................... 711/114 |
| 6,237,063 B1 | * | 5/2001 | Bachmat et al. ............. 711/114 |

\* cited by examiner

Primary Examiner—Do Hyun Yoo
Assistant Examiner—Brian R. Peugh
(74) Attorney, Agent, or Firm—George A. Herbster

(57) ABSTRACT

Load balancing of activities on physical disk storage devices is accomplished by monitoring reading and writing operations to blocks of contiguous storage locations on the physical disk storage devices. A list of exchangeable pairs of blocks is developed based on size and function. Statistics accumulated over an interval are then used to obtain access activity values for each block and each physical disk drive. A statistical analysis leads to a selection of one block pair. After testing to determine any adverse effect of making that change, the exchange is made to more evenly distribute the loading on individual physical disk storage devices.

34 Claims, 13 Drawing Sheets

LOAD BALANCING ON DISK ARRAY STORAGE DEVICE

CROSS REFERENCES TO RELATED APPLICATIONS

This is a continuation of U.S. Pat. No. 6,341,333 issued Jan. 22, 2002 (Ser. No. 09/396,218 filed on Sep. 15, 1999) and is a continuation-in-part of U.S. Pat. No. 6,189,071 issued Feb. 13, 2001 (Ser. No. 09/143,683 filed Aug. 28, 1998) that is a continuation-in-part of application for U.S. Pat. No. 6,088,766 issued Jul. 11, 2000 (Ser. No. 09/002,428 filed Jan. 2, 1998) that is a continuation-in-part of U.S. Pat. No. 6,061,761 issued May 9, 2000 (Ser. No. 08/944,606 filed Oct. 6, 1997).

U.S. Pat. No. 6,341,333 is a continuation-in-part of U.S. Pat. No. 6,189,071 issued Feb. 13, 2001 (Ser. No. 09/143,683 filed Aug. 28, 1998) that is a continuation-in-part of application for U.S. Pat. No. 6,088,766 issued Jul. 11, 2000 (Ser. No. 09/002,428 filed Jan. 2, 1998) that is a continuation-in-part of U.S. Pat. No. 6,061,761 issued May 9, 2000 (Ser. No. 08/944,606 filed Oct. 6, 1997).

All the foregoing applications are assigned to the same assignee as this invention.

BACKGROUND OF THE INVENTION

1. Field of the Invention

This invention generally relates to the management of resources in a data processing system and more particularly to the management of a disk array storage device.

2. Description of Related Art

Many data processing systems now incorporate disk array storage devices. Each of these devices comprises a plurality of physical disks arranged into logical volumes. Data on these devices is accessible through various control input/output programs in response to commands, particularly reading and writing commands from one or more host processors. A Symmetrix 5500 series integrated cached disk array that is commercially available from the assignee of this invention is one example of such a disk array storage device. This particular array comprises multiple physical disk storage devices or drives with the capability of storing large amounts of data up to several terabytes or more. The management of such resources becomes very important because the ineffective utilization of the capabilities of such an array can affect overall data processing system performance significantly.

Generally a system administrator will, upon initialization of a direct access storage device, determine certain characteristics of the data sets to be stored. These characteristics include the data set size, and volume names and, in some systems, the correspondence between a logical volume and a particular host processor in a multiple host processor system. Then the system administrator uses this information to configure the disk array storage device by distributing various data sets across different physical devices accordingly with an expectation of avoiding concurrent use of a physical device by multiple applications. Often times allocations based upon this limited information are or become inappropriate. When this occurs, the original configuration can degrade overall data processing system performance dramatically.

One approach to overcoming this problem has been to propose an analysis of the operation of the disk array storage device prior to loading a particular data set and then determining an appropriate location for that data set. For example, U.S. Pat. No. 4,633,387 to Hartung et al. discloses load balancing in a multi-unit data processing system in which a host operates with multiple disk storage units through plural storage directors. In accordance with this approach a least busy storage director requests work to be done from a busier storage director. The busier storage director, as a work sending unit, supplies work to the work requesting, or least busy, storage director.

U.S. Letters Pat. No. 5,239,649 to McBride et al. discloses a system for balancing the load on channel paths during long running applications. In accordance with the load balancing scheme, a selection of volumes is first made from those having affinity to the calling host. The load across the respective connected channel paths is also calculated. The calculation is weighted to account for different magnitudes of load resulting from different applications and to prefer the selection of volumes connected to the fewest unused channel paths. An optimal volume is selected as the next volume to be processed. The monitored load on each channel path is then updated to include the load associated with the newly selected volume, assuming that the load associated with processing the volume is distributed evenly across the respective connected channel paths. The selection of the following volume is then based on the updated load information. The method continues quickly during subsequent selection of the remaining volumes for processing.

In another approach, U.S. Letters Pat. No. 3,702,006 to Page discloses load balancing in a data processing system capable of multi-tasking. A count is made of the number of times each I/O device is accessed by each task over a time interval between successive allocation routines. During each allocation, an analysis is made using the count and time interval to estimate the utilization of each device due to the current tasks. An estimate is also made with the anticipated utilization due to the task undergoing allocation. The estimated current and anticipated utilization are then considered and used as a basis for attempting to allocate the data sets to the least utilized I/O devices so as to achieve balanced I/O activity.

Each of the foregoing references discloses a system in which load balancing is achieved by selecting a specific location for an individual data set based upon express or inferred knowledge about the data set. An individual data set remains on a given physical disk unless manually reconfigured. None of these systems suggests the implementation of load balancing by the dynamic reallocation or configuration of existing data sets within the disk array storage system.

Another load balancing approach involves a division of reading operations among different physical disk drives that are redundant. Redundancy has become a major factor in the implementation of various storage systems that must also be considered in configuring a storage system. U.S. Letters Pat. No. 5,819,310 granted Oct. 6, 1998 discloses such a redundant storage system with a disclosed disk array storage device that includes two device controllers and related disk drives for storing mirrored data. Each of the disk drives is divided into logical volumes. Each device controller can effect different reading processes and includes a correspondence table that establishes the reading process to be used in retrieving data from the corresponding disk drive. Each disk controller responds to a read command that identifies the logical volume by using the correspondence table to select the appropriate reading process and by transferring data from the appropriate physical storage volume containing the designated logical volume.

Consequently, when this mirroring system is implemented, reading operations involving a single logical volume do not necessarily occur from a single physical device. Rather read commands to different portions of a particular logical volume may be directed to any one of the mirrors for reading from preselected tracks in the logical volume. Allowing such operations can provide limited load balancing and can reduce seek times.

Other redundancy techniques and striping techniques can tend to spread the load over multiple physical drives by dividing a logical volume into sub-volumes that are stored on individual physical drives in blocks of contiguous storage locations. However, if the physical drives have multiple logical volumes, sub-volumes or other forms of blocks of contiguous storage locations, the net effect may not balance the load with respect to the totality of the physical disk drives. Thus, none of the foregoing references discloses or suggests a method for providing a dynamic reallocation of physical address space based upon actual usage.

SUMMARY

Therefore it is an object of this invention to enable a dynamic reallocation of data in a plurality of physical disk storage devices to reduce any imbalance of load requirements on each physical disk storage.

Another object of this invention is to determine the relative utilization of physical disk storage devices to reduce imbalances in the utilization.

In accordance with this invention it is possible to balance loads on physical disk storage devices in a disk array storage device wherein at least two physical disk storage devices store data in a plurality of logical volumes and wherein each physical disk storage device responds to a data transfer request to read or write data. Balancing is achieved by generating operational data including the number of accesses to each logical volume on predetermined ones of the physical disk storage devices in response to data transfer requests. The method converts the operational data into disk utilization values for each predetermined physical disk storage device and for each logical volume in the predetermined physical disk storage devices. Analyzing the disk utilization values leads to the selection of a pair of logical volumes that, if exchanged, would improve load balance for the predetermined physical storage devices. Once the method makes the identification, it exchanges the selected logical volumes.

In accordance with another aspect of this invention, it is possible to balance loads on physical disk storage devices in a disk array storage device wherein at least two physical disk storage devices store data in a plurality of logical volumes and each physical disk storage device responds to a data transfer request to read or write data. The method includes a step defining the length of an analysis interval and included analysis subintervals and generating, for each subinterval, operational data including the number of accesses to each logical volume on predetermined ones of the physical disk storage devices in response to data transfer requests. The method converts the operational data obtained during each subinterval into disk utilization values for each predetermined physical disk storage device and each logical volume in the predetermined physical disk storage devices. An analysis of these disk utilization values enables the selection of a pair of logical volumes that, if exchanged, would improve load balance for the predetermined physical storage devices. The method ends with the exchange of the selected logical volumes.

In accordance with still another aspect of this invention it is possible to balance loads on physical disk storage devices in a disk array storage device wherein at least two physical disk storage devices store data in a plurality of logical volumes and each physical disk storage device responds to a data transfer request to read or write data. The method begins by defining the length of an analysis interval and generating, for each subinterval, operational data including the number of accesses to each logical volume on predetermined ones of the physical disk storage devices in response to data transfer requests. The method converts the operational data obtained during each subinterval into disk utilization values for each predetermined physical disk storage device and each logical volumes in the predetermined physical disk storage devices. An analysis of the disk utilization values provides a selection of a pair of logical volumes that, if exchanged, would improve load balance for the predetermined physical storage devices. The method terminates after exchanging the selected logical volumes automatically.

In accordance with yet another aspect of this invention, it is possible to balance loads on physical disk storage devices in a disk array storage device wherein at least two physical disk storage devices store data in a plurality of logical volumes and each physical disk storage device responds to a data transfer request to read or write data. The method begins by defining the length of a first analysis interval and a second analysis interval that includes a plurality of first analysis intervals. Operational data is generated for each of the first and second analysis intervals, and this operational data includes the number of accesses to each logical volume on predetermined ones of the physical disk storage devices in response to data transfer requests. An automatic process runs to exchange the data in a pair of logical volumes upon the completion of each first analysis interval in response to the processing of predetermined operational data during each first analysis interval. An exchange of data in a pair of logical volumes also occurs upon the completion of each second analysis interval.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
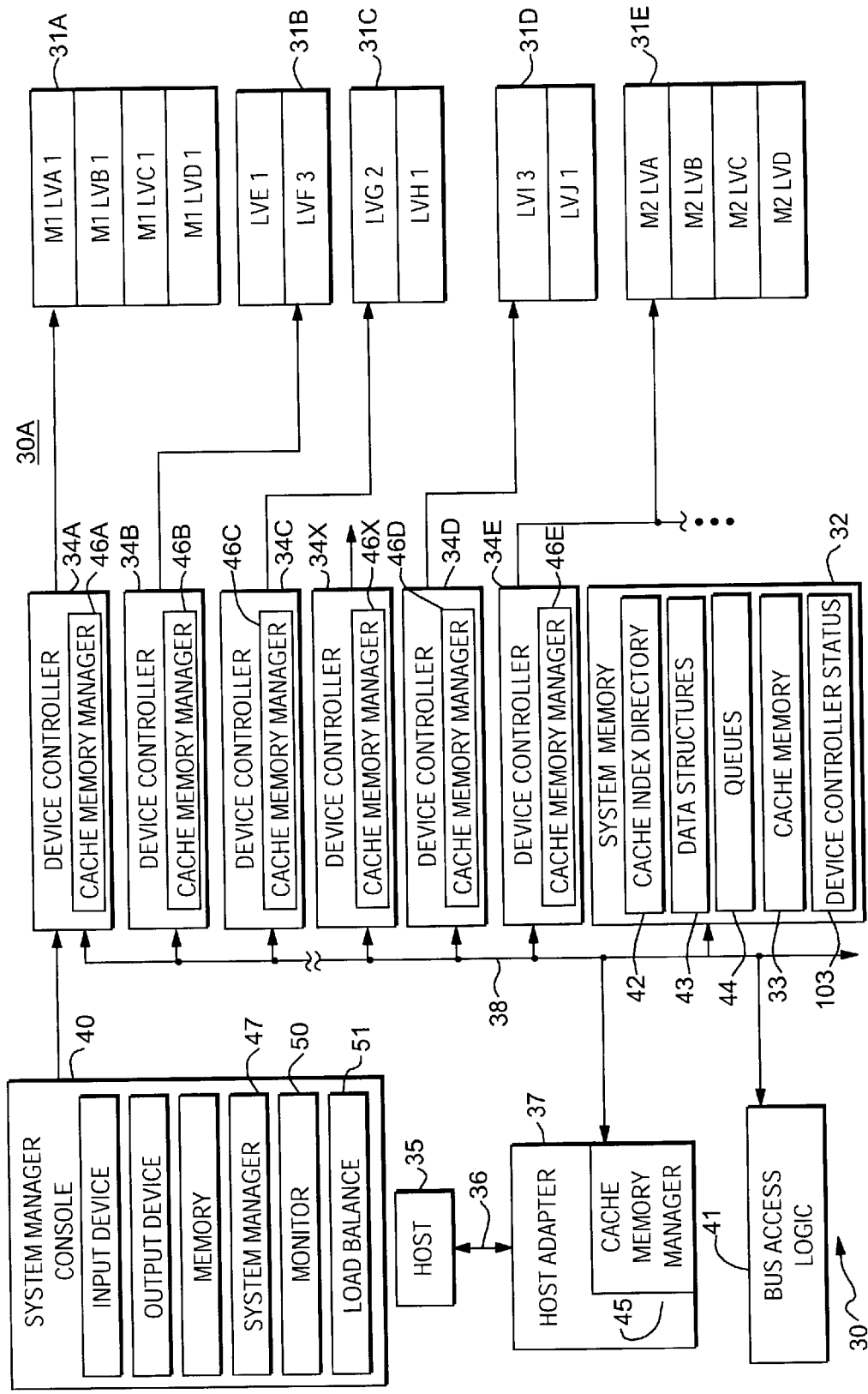
FIG. 1 is a block diagram of a specific data processing system that implements this invention.

FIG. 1 depicts, in block form, and as a typical data processing system 30, a Symmetrix 5500 series integrated cached disk array that includes such a data memory system with a number of data storage devices or physical disk storage devices 31A, 31B, 31C, 31D and 31E, by way of example, and a system memory 32 with a cache memory 33. In this particular embodiment the system 30 includes several device controllers 34A, 34B, 34C, 34D and 34E connected to corresponding ones of the physical disk storage devices 31A through 31E plus a device controller 34X representing other controllers and attached physical disk storage devices. Each device controller may have a known basic structure or a more sophisticated structure associated with mirrored operations as described in the above-identified U.S. Letters Pat. No. 5,819,310.

The device controller 34A is shown with an associated physical disk storage device 31A divided into the mirrored logical volumes M1-LVA, M1-LVB, M1-LVC and M1-LVD; the device controller 34E controls the other physical disk storage device 31E that stores the mirrored logical volumes M2-LVA, M2-LVB, M2-LVC and M2-LVD. The logical volumes in physical disk storage devices 31A and 31E are assumed to have the same size for purposes of this explanation. However, mirrored and non-mirrored logical volumes in a physical disk storage device can have different sizes. For example, physical disk storage device 31B is depicted with two logical volumes LVE and LVF.

Assume that the LVE logical volume has the same size as the logical volumes in the. physical disk 31A and that the logical volume LVF has a size that is three times the size of the logical volume LVE. Physical disk storage device 31C is shown with al logical volume LVG having twice the size of a logical volume LVH which, in turn, would have the same size as the logical volume LVA. Physical disk storage device 31D has a logical volume LVI which is three times the size of the logical volume LVJ which, in turn, has the same size as the logical volume LVA.

Moreover, there is no requirement that mirrored logical volumes in one physical disk storage device need to be mirrored on a single mirroring physical disk storage device. For example the locations of the LVJ and M2-LVA logical volumes could be interchanged. As will become apparent, in actual practice the absolute and relative sizes of logical volumes and the positions of the logical volumes will vary.

Still referring to FIG. 1 a single processor or host 35, an interconnecting data access channel 36 and a host adapter 37 connect to the system memory 32 over a system bus 38. A typical data processing system 30 may comprise multiple host adapters that connect to the system bus 38 in parallel. One or more hosts may also connect to each host adapter.

A system manager console or service processor 40 includes an additional processor that connects to the system bus 38 typically through one or more of the device controllers, such as device controller 34A by means of a serial or other communications link to the device controller 34A. The system manager console 40 permits a system operator to run set-up and diagnostic programs for configuring, controlling and monitoring the performance of the data processing system 30. Essentially the system manager console 40 enables the operator to establish communications with the host adapter 37, the device controller 34B and the system memory 32. One approach to communications among the various host and disk adapters and the service processor system manager is described in the above-referenced U.S. Letters patent application Ser. No. 09/396,146.

Before any component, such as the host adapter 37 or the device controllers 34A and 34B can access the system memory 32, that component must obtain access to the system bus 38. Conventional bus access logic 41 receives access request signals from these components and grants access to only one such component at any given time. A wide variety of known arbitration schemes are suitable for use in a data storage system employing multiple processors and a shared system memory, such as the system memory 32.

Preferably the system memory 32 in FIG. 2 is a high-speed random-access semiconductor memory that includes, as additional components, a cache index directory 42 that provides an indication including the addresses of the data which is stored in the cache memory 33. In a preferred embodiment, the cache index directory 42 is organized as a hierarchy of tables for logical devices, cylinders, and tracks. The system memory 32 also includes areas for data structures 43 and queues 44. The basic operation of the system memory 32 is described in Yanai et al., U.S. Letters Pat. No. 5,206,939 issued Apr. 27, 1993. System memory 32, particularly the cache memory 33, may also include a region of memory known as permacache memory. As is well known, data elements remain in permacache memory unless they are specifically deleted.

The coordination of each of the host adapters with each of the device controllers is simplified by using the system memory 32, and in particular the cache memory 33, as a buffer for data transfers between each host adapter and each device controller. Such a system, for example, is described in U.S. Letters Pat. No. 5,206,939. In such a system, it is not necessary to provide a processor dedicated to managing the cache memory 33. Instead, each of the host adapters or device controllers executes a respective cache manager program, such as one of the cache manager programs 45 in the host adapter 37 and cache manager programs 46A and 46B in each of the device controllers 34A through 34X. A system manager program 47 performs a similar function for the system manager console 40 and enables the operator to configure the system. Each of the cache manager programs accesses the cache index directory 42 and operates With data structures and queues for storing various commands. More specifically, the cache manager program 45 in the host adapter 37 writes data from the host 35 into the cache memory 32 and updates the cache index directory 42.

In addition, and in accordance with this invention, each cache memory manager gathers statistics. Specifically, the cache memory manager 45 will accumulate statistics concerning a number of parameters. For the purpose of this invention, the number of reading and writing operations requested by a host 35 or connected hosts are important. Likewise each of the cache memory managers 46A through 46X in each of the device controllers 34A through 34X gathers statistics for the logical volumes on each connected physical disk storage device. A monitor 50 in the system manager console 40 integrates these cache memory managers to obtain appropriate statistics at given intervals.

From the foregoing, disk operations included in any measure of the loading of a logical volume will include reading operations and writing operations. Reading operations can be further classified as read-hit, read-miss and sequential read operations. A read-hit operation occurs when the data to be read resides in the cache memory 33. A read-miss occurs when the data to bee read is not available in the cache memory 33 and must be transferred from a physical disk storage device. Sequential read operations are those that occur from sequentially addressed storage locations.

The system operates with two types of writing operations. The first transfers the data from the host 35 to the cache memory 33. The second type transfers the data from the cache memory 33 to a physical disk storage device. The second type operates in a background mode, so it is possible that the host 35 may write data to a location more than once before the data is written to a physical disk storage device. Consequently the number of writing operations of the second type normally will not correspond to and will be less than the number of writing operations of the first type.

With this background, the determination of appropriate reallocations of logical volumes on physical disks in accordance with this invention can be described. The program relies upon information supplied from the performance monitor 50 that retrieves statistics from each cache memory manager on a periodic basis. The periodicity will be selected according to conventional sampling criteria. Typical periods will be from up to 15 to 30 or more minutes. As each set of statistics is time stamped and accumulated by logical volume, the total number of read operations, a read-hit ratio, a sequential-read ratio and the total number of writing operations over a test interval can be obtained. The load balance program 51 shown in FIG. 1 then operates according to FIGS. 2A and 2B to generate, from that collected monitored performance generally represented by step 60 in FIG. 3A, a reallocation or exchange of a pair of logical volumes.

Specifically, when it is time to perform an analysis, a wait loop represented as a decision step 61 transfers control to retrieve, by means of the performance monitor 50 in step 62, all the statistics that are relevant to the test interval.

The load balance program 51 uses step 63 to define a list of pairs of exchangeable logical volumes. There are several criteria that must be evaluated in determining this list. First, exchangeable logical volumes must have the same size. In actual practice most logical volumes will be selected from one of a relatively small number of physical sizes. Second, any interrelationship between the two logical volumes to be exchanged must be examined to determine whether there is any reason to preclude the exchange. For example, swapping logical volumes on the same physical disk storage device generally will have little or no impact. Mirroring, as described in the above-identified U.S. Letters Pat. No. 5,819,310 or other redundancy may further restrict the available exchangeable pairs of logical volumes. For example, mirrored logical volumes normally will be precluded from residing on the same physical disk storage device or even on physical disk storage devices on the same controller or adjacent controllers. For RAID-5 redundancy, exchangeable pairs of logical volumes usually will be limited to those in the same parity group.

In the specific example of FIG. 1, based on size, the logical volumes LVA through LVE, LVH and LVJ are all potential exchange candidates. Likewise the logical volumes LVF and LVI are candidate for exchange. There is no logical volume as a candidate for exchanging with the LVG logical volume in the specific embodiment shown in FIG. 2.

Using the functional criteria, the potential logical volumes that could be swapped with the logical volume M1-LVA in the physical drive 31A include logical volumes LVE, LVH and LVJ, assuming that an exchange with a mirror would have no effect. Swapping the LVA logical volume in physical disk 31A with any of the logical volumes LVB through LVD in physical drive 31E is precluded because both mirrors of the logical volume LVA would be resident on the same physical disk drive. Other potential logical volume pairs include the pairs LVE-LVH, LVH-LVJ and LVE-LVJ. The logical volumes LVF and LVI define one exchangeable pair. Thus in this particular embodiment there are twenty-seven possible exchangeable pairs of logical volumes.

In step 64, the load balance program uses the accumulated statistics and read-hit ratio to produce a read-miss value, a sequential-read value and a write-to-disk value for each logical volume over the prior test interval. As previously indicated the read-miss value corresponds to the number of read operations that require access to a physical disk drive for data, a read-hit being a reading operation that finds the requested data in the cache memory 33 of FIG. 2. When step 64 is completed, there exists, for each logical volume, a logical volume access activity value, x, represented by the sum of the read-miss and write-to-disk operations.

The logical volume access activity value can be further refined or weighted to reflect the actual load imposed by different operations. For example, each write operation can be considered as imposing half the load of a read-miss operation. If such an assumption is carried forward, the logical volume access activity is equal to the total number of read-miss operations plus half the total number of write operations. If a series of sequential-read operations occur, the number of events in the sequence can be divided by 4 or some other number to compensate for the difference in loading imposed by sequential and random reading operations. In a mirrored configuration, a read-miss results in only one read operation being performed although there is a potential for two, one from each mirror. Consequently, in a mirrored system the number of read misses to a mirrored logical volume will be halved to compensate for mirroring.

In step 65 the load balancing program 51 constructs a table that identifies the total weighted access activity value for each physical storage device by summing, for each physical disk storage device, the access activity values for each logical volume on that physical disk storage device. At this point a total average physical activity value can also be obtained by summing the physical volume access activity values and dividing by the number of physical devices.

Figure 2A:
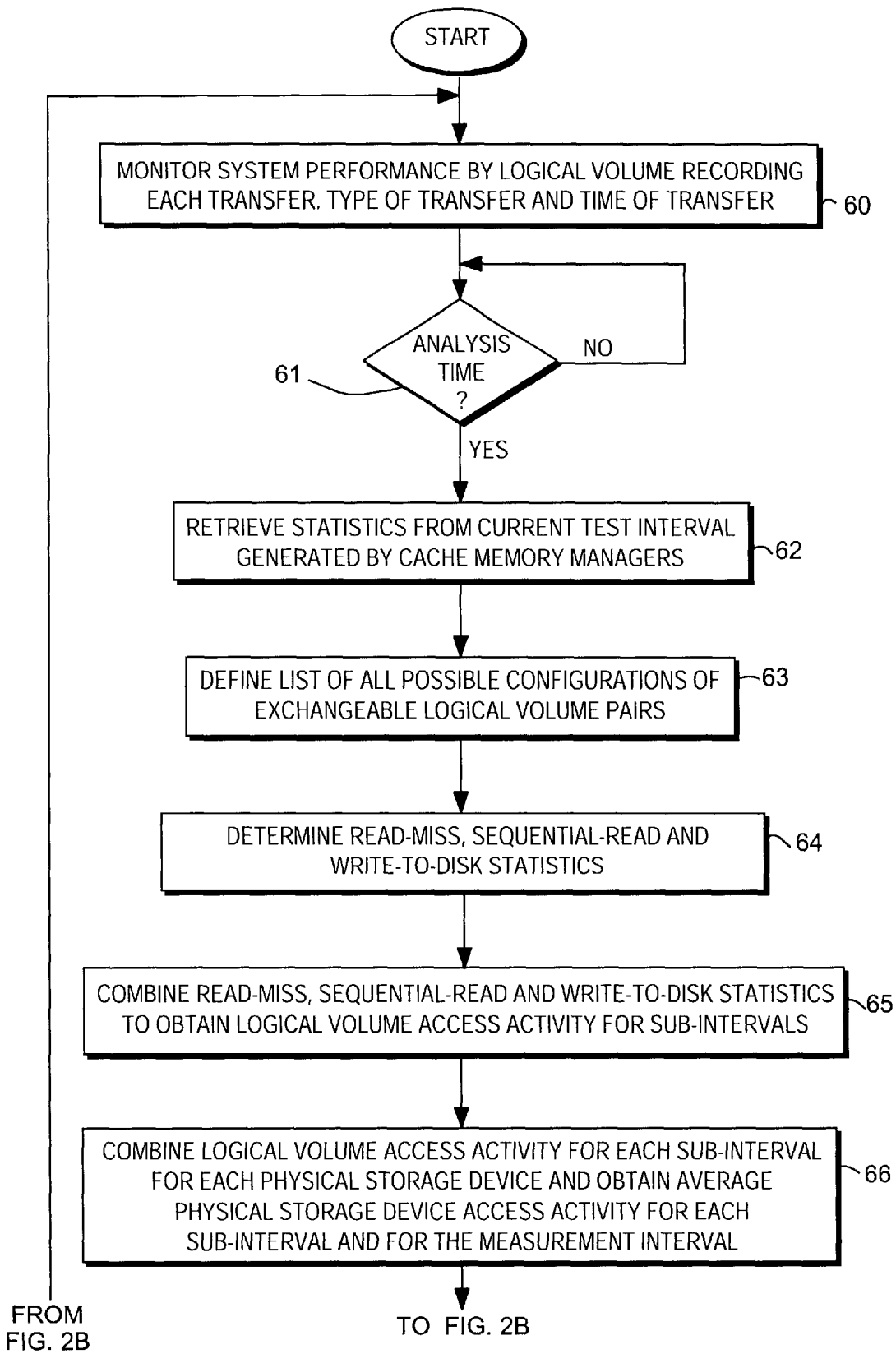
FIGS. 2A and 2B constitute a flow diagram that depicts one procedure for exchanging logical volumes in accordance with this invention.
Figure 2B:
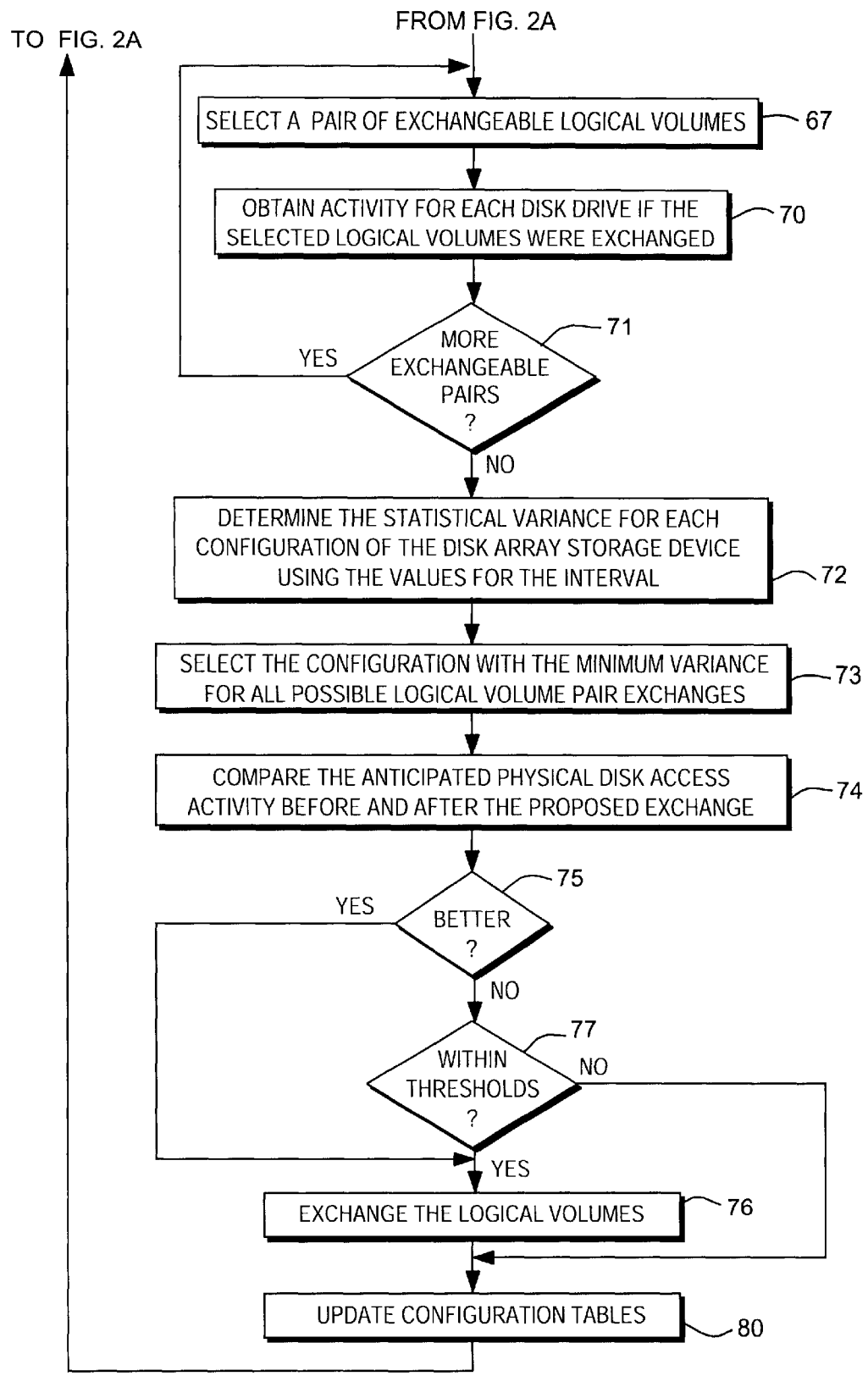

When step 66 in FIG. 2A has been completed, control passes to steps 67 and 70 that form a loop under a loop control 71 in FIG. 2B. Specifically step 67 selects a pair of logical volumes from the list developed in step 63 of FIG. 2A. Assume, for example, that the pair M1 LVA-LVE is selected. In step 70 the load balancer program 51 utilizes the accumulated statistics for obtaining the activity for each physical disk drive as if those two logical volumes had been exchanged. This loop continues until all the logical volume pairs in the list have been evaluated. Once this occurs, control branches to step 72 to define a statistical variance for each configuration according to:

$$|E(x^2) - [E(x)]^2|_{min} \tag{1}$$

That is, for each possible configuration the load balance program 51 step 72 determines the average access activity value for the physical disk storage devices with the logical volume pairs and obtains a difference from the average physical drive access activity value obtained in step 65 assuming each pair is exchanged. Thereafter step 72 produces the statistical variance for each logical volume pair exchange. In step 73 the load balancer program 51 selects a logical volume pair that produces the minimum statistical variance. Processes for obtaining the above-identified statistical variances are well known in the art.

After that selection, the identity of the logical-volume pair is used in a pretest of the selection. As previously indicated, the monitor 50 accumulates data as discrete sets on a periodic and recorded time basis. In step 74 the load balancing program breaks the total test interval into subintervals that may include one or more sampling periods. Next the activity values for each subinterval or group of subintervals are determined. If the access activity value for exchange effected physical drives is less than the original, step 75 branches to step 76 to initiate the exchange. If a subinterval exists that exceeds the average, step 77 determines whether the access activity value is within an acceptable limit. If it is, the exchange occurs in step 77 and the configuration tables in the system are updated to reflect the new configuration. Otherwise no exchange is made.

When step 76 exchanges the designated logical volumes, such an exchange, or swap, can occur by selecting an unused area in one of the physical disk drives to operate as a buffer. This may be an unused area in a physical disk storage device or in a dynamic spare physical disk storage device. The general use of physical disk storage devices as dynamic spares is known in the art. In other circumstances it may be possible to utilize a cache memory such as the cache memory 33 in FIG. 2, as a buffer. If a single buffer is to be used and logical volumes LVE and LVJ are to be exchanged, a concurrent copy or other transfer sequence can move (1) the LVE logical volume to the buffer, (2) the logical volume LVJ to the corresponding area in the physical disk storage device 31B and (3) the logical volume buffer to the area in physical disk storage device 31D. The use of a concurrent copy or other analogous procedure enables the exchange to occur on-line, albeit with some performance degradation for the duration of the transfer. After the exchange is completed, control branches back to step 60 in FIG. 3A to initiate the monitor 50 thereby to accumulate additional statistics about the new configuration.

In accordance with this specific example, assume that both the logical volumes LVE and LVF in physical disk storage device 31B have become very active and that the logical volume LVJ on physical disk storage device 31D is relatively inactive. If all other logical volumes were equally active, the statistical variance should be minimal when the logical volume pair LVE and LVJ is selected. Therefore those two volumes would be exchanged thereby decreasing the load on the physical disk storage device 31B and increasing the load on the physical disk storage device 31D, but not to the extent that had existed on the physical disk storage device 31B.

Still other procedures for effecting the exchange can be adapted to this invention.

Figure 3:
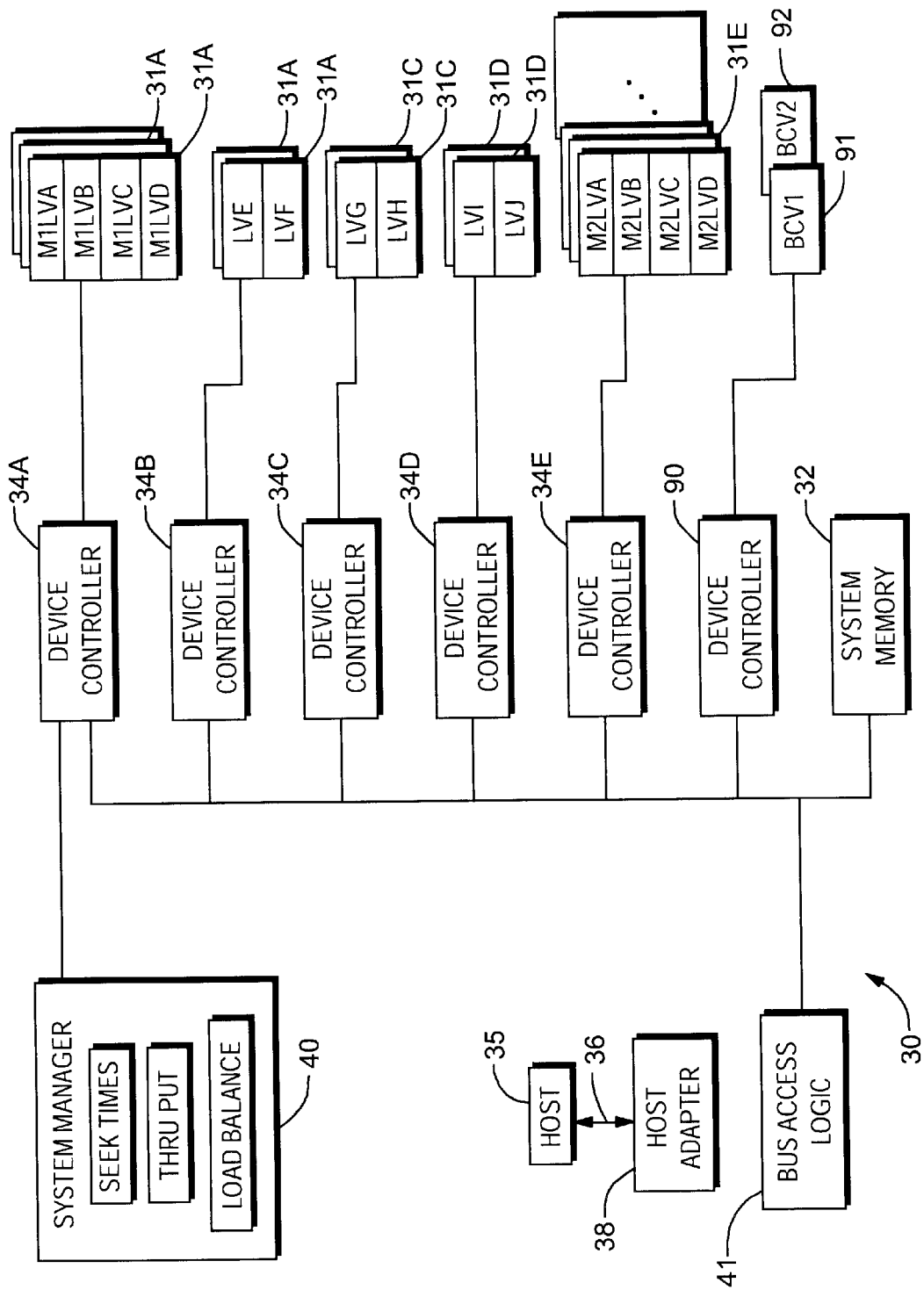
FIG. 3 is a block diagram of another specific data processing system that provides another type of data exchange.

FIG. 3 depicts a modification of the circuit of FIG. 1 in which like reference numerals apply to like items. The modification of FIG. 3 primarily consists of the addition of one or more device controllers, such as a device controller 90 with two specially configured logical volumes 91 and 92. These are a type Df BCV device as described in the foregoing U.S. Letters Pat. No. 6,088,766.

These devices are called data relocation volumes (DRV's) to distinguish them from BCV devices. They operate in response to the same ESTABLISH and SPLIT commands as BCV devices. The major difference for the purposes of understanding this invention lies in the fact that these devices are internal storage volumes that are only accessible to a system operator through the system manager console or service processor 40. They are not directly available to user or application generated I/O requests. However, they will act like a BCV when paired with a logical volume that is available to user or application software. Thus, if a user or application generated write request is received by the logical volume, that write request will be received by the established DRV. In addition, a DRV logical volume responds to other commands not incorporated in a conventional BCV device.

Figure 4A:
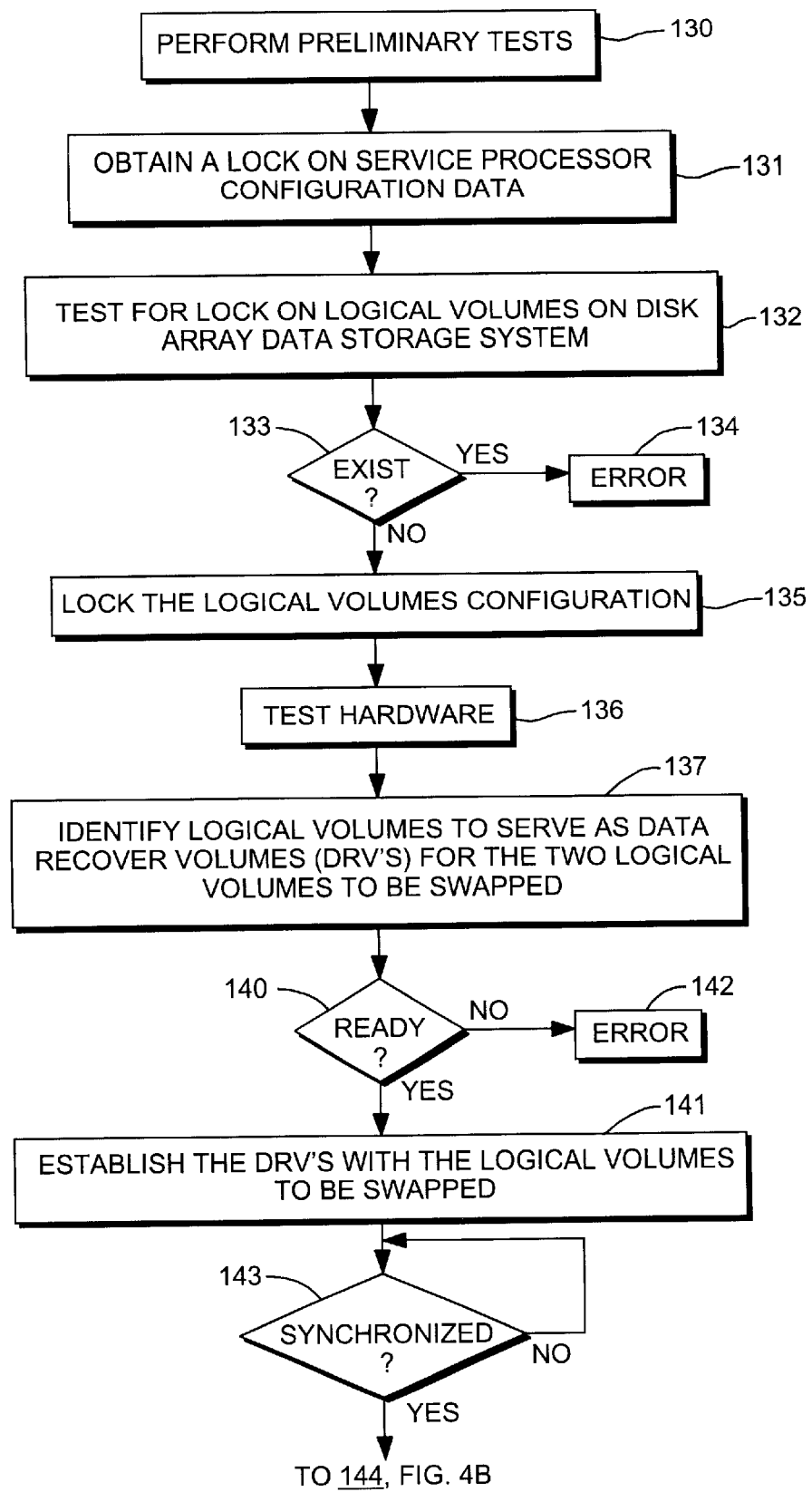
FIGS. 4A and 4B constitutes a flow diagram that depicts the implementation of a procedure for exchanging logical volumes in accordance with this invention.
Figure 4B:
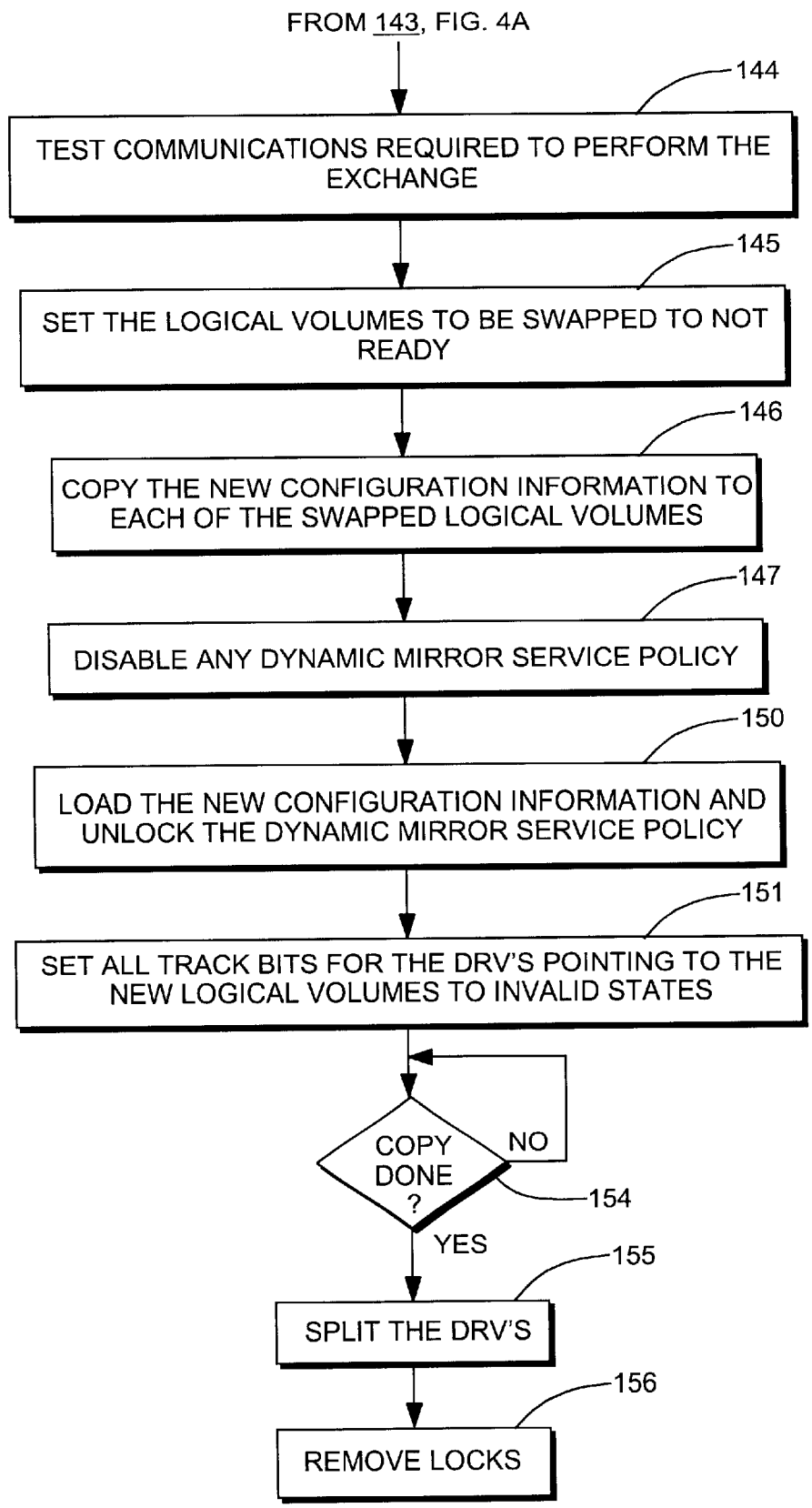
Figure 5A:
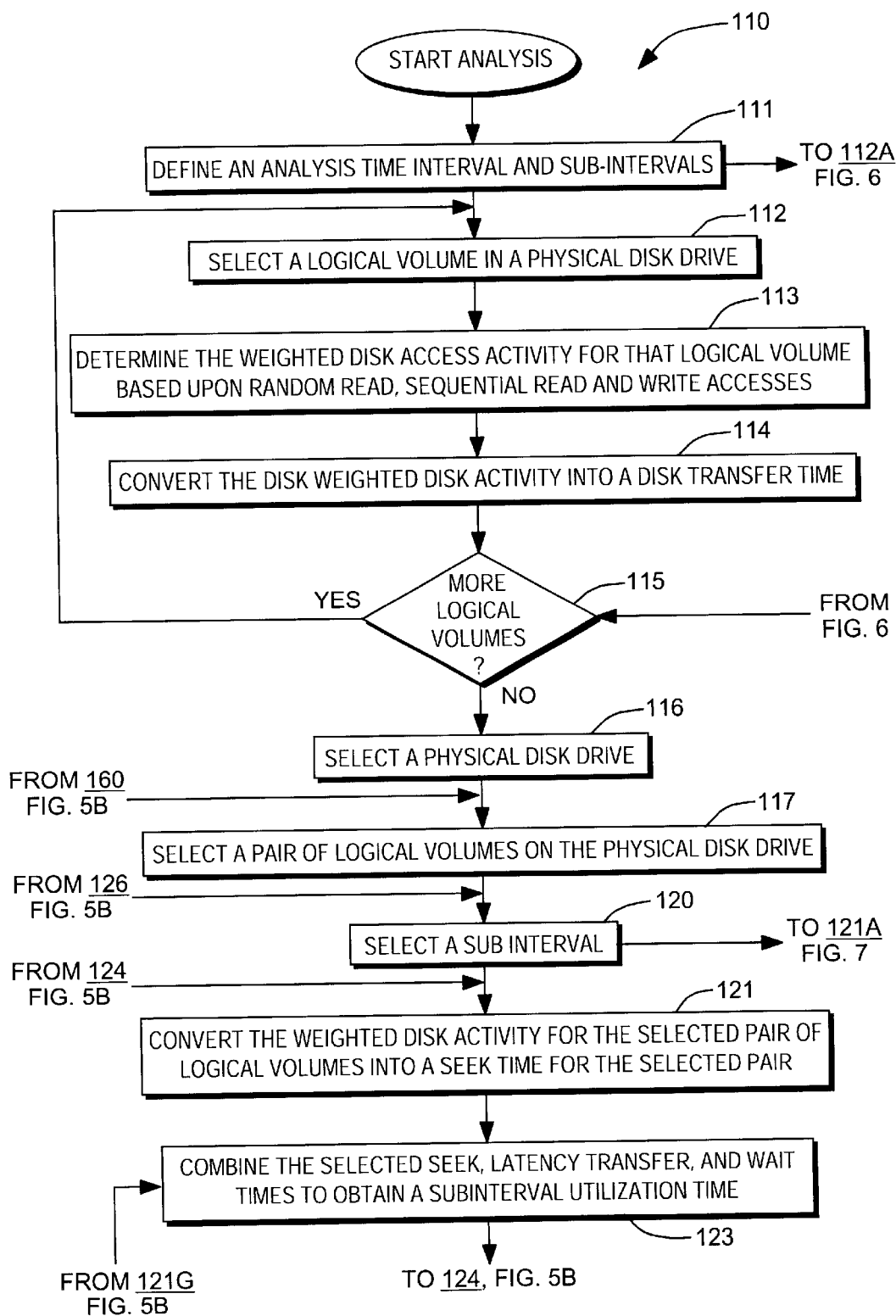
FIGS. 5A and 5B constitutes a flow diagram that depicts an alternative procedure for identifying logical volumes to be exchanged.

When it is desired to make an exchange to reallocate a pair of logical volumes, the system manager console or service processor 40 uses the procedures set forth in FIGS. 4A and 4B to control a configuration of logical volumes. FIG. 5A depicts a number of logical volumes 100 for use in such an exchange. For purposes of understanding the basic operation of this invention, four physical disk drives need to be considered. They include physical disk storage devices 101, 102, 103 and 104. Physical disk storage device 101 is depicted as including three logical volumes including an M1 mirror of logical volume LV1, that is stored in a section or partition of the physical disk storage device 110; i.e., the LV1-M1 logical volume 105. In this embodiment the physical disk storage device 101 is also depicted as storing data in an LV2-M3 logical volume 106 and LV3-M1 logical volume 107. The physical disk storage device 102 includes an LV4-M1 logical volume 110, an LV5-M1 logical volume 111 find an LV6-M2 logical volume 112. For purposes of understanding this invention, the LV1-M1 logical volume 115 and the LV4-M1 logical volume 110 are relevant.

The physical disk storage devices 103 and 104 include LVn and LVp logical volumes, 113 and 114. Additional storage volumes are available in the form of volumes 115 on physical disk storage device 103 and volume 116 on physical disk storage device 104. The logical volumes 115 and 116 are also relevant to this invention.

Figure 8A:
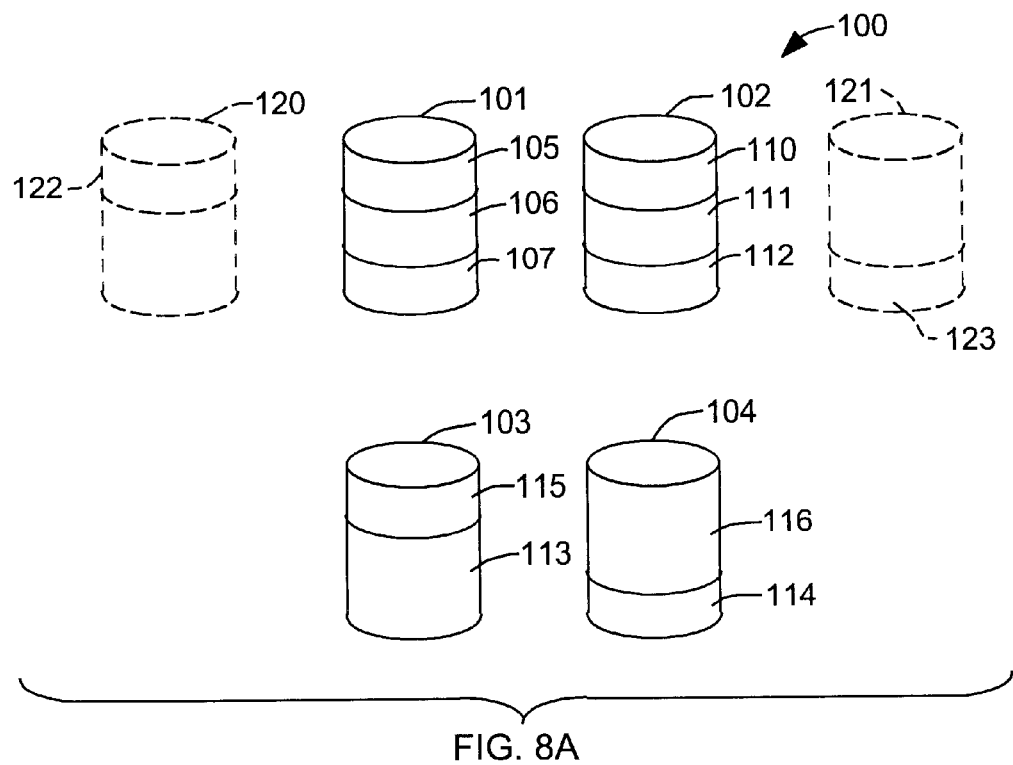
FIGS. 8A through 8E graphically depict stages of an exchange and will be helpful in understanding the procedures of FIGS. 4A and 4B.

FIG. 8A depicts two additional physical disk storage devices 120 and 121 in phantom. These are physical disk storage devices that contain a second mirror for the LV1 storage volume i.e., LV1-M2 logical volume on the physical disk storage device 120 and an LV4-M2 logical volume 123 on the physical disk storage device 121 as a second mirror for the LV4 logical volume. Interactions of mirrored logical volumes, such as the LV1-M1 and LV1-M2 mirrored logical volumes and the LV4-M1 and LV4-M2 mirrored logical volumes, are known. These mirrored logical volumes are shown because this invention normally will be implemented with mirrored logical volumes. As will become apparent however, this invention is also useful in exchanging non-mirrored logical volumes.

Referring again to FIG. 4A, when a system operator initiates an exchange through the system manager console or service processor 40 the operator supplies the identity of the logical volumes to be exchanged, such as the, LV1-M1 and LV4-M1 logical volumes 105 and 110. The system operator also identifies two logical volumes to be used as data relocation volumes, designated as DRV1 and DRV2 volumes 115 and 116 in FIG. 8A.

In such devices, many of the control functions are performed by microprocessors operating under various versions of microcode Initially the system manager 40 will perform a number of tests in step 130 to verify various operating conditions. Step 130 might, for example, determine the presence and availability of necessary files and might verify that the microprocessor or microprocessors to be involved with the exchange are operating with appropriate code versions. Those tests typically will be passed. If they are not, an error message, not shown in FIG. 4A, will be generated. Various steps and procedures for performing.such tests are well known to persons of ordinary skill in the art.

Step 131 obtains a lock on relevant configuration data in the service processor 40. Locking processes, as known, assure that certain programs, in this case programs other than the exchange program, can not effect locked information. This allows the remaining steps in FIGS. 4A and 4B to occur without any possibility of other programs producing some conflict or corrupting configuration data.

The various logical volumes designated by the exchange command are also tested in step 132. These tests include, for example, determining of all the bit track positions in a track table are valid, determining that the logical volumes are in a Ready State and no user has requested a BCV Establish operation with the logical volume. Other tests might be used as tests in addition or in lieu of such tests. If any test fails, control transfers from step 133 to step 134 to announce this condition. If all the tests pass, control transfers to step 135 to lock the logical volume configuration, again so that the configuration information can not be modified inadvertently. Step 136 then undertakes a test of various hardware components in the configuration to assure proper operation of the exchange. These tests are analogous in scope to the tests performed in step 130.

Step 137 identifies the two internal disk volumes or data relocation volumes that are to be swapped. In the specific example of FIG. 8A, these are the DRV1 and DRV2 logical volumes 115 and 116. The best match occurs in this process when the selected DRV logical volumes, such as the DRV1 and DRV2 logical volumes 115 and 116, are a good match to the logical volumes to be swapped, in this case, the LV1-M1 and LV4-M1 logical volumes 105 and 110.

The selection process may also be required to follow other rules. For example, DRV logical volumes may be precluded if they reside on the same spindle with another mirror of the same logical volume. In this embodiment the DRV1 logical volume 115 should not be on the physical disk storage device 120. The DRV logical volume must be at least the same size and have the same format as the logical volumes being exchanged. In this case it is assumed that the DRV1 logical volume 115 is the same size as the LV1-M1 and LV4-M1 logical volumes. The logical DRV2 volume 116 is depicted as having an alternate and acceptable larger storage capacity. Alternatively the DRV2 logical volume could be configured to an exact size and allowing any remaining portion of the physical disk storage device, or unassigned portion of the physical disk storage device to be used for other purposes.

Other tests may insure that the DRV1 and DRV2 logical volumes 115 end 116 are not on the same memory bus of the other mirror, such as the memory bus connecting to the LV1-M2 logical volume 122 or the LV4-M2 logical volume 123. In certain embodiments, it may be required that the data relocation volumes also not be on a dual-disk adapter or device controller of the other mirror or not on the same disk adapter as the other mirror.

If all of these conditions, or others are satisfied, step 140 transfers control to step 141. Otherwise an error condition exists and control transfers to step 142 to generate an appropriate error message.

As control transfers to step 141, the configuration of relevant physical disk storage devices and logical volumes is shown in FIG. 8A. Step 141 in FIG. 4A issues an ESTABLISH command to each of the logical volume pairs. The first pair includes the LV1-M1 and DRV1 logical volumes 105 and 115; the second pair, the LV4-M1 and DRV2 logical volumes 110 and 116.

In the particular implementation of the assignee of this invention, each logical volume includes a device header and each device header includes a track table for up to four mirrors. The track tables effectively define a two-dimension matrix in which each column represents one of a number of logical volume mirror, M1, M2, M3 and M4. Each row corresponds to a track in that logical volume. As described U.S. Letters Pat. No. 6,101,497, and referring to FIG. 8A the ESTABLISH command operates by assigning one of the logical volume mirrors for the LV1 logical volume 105 (e.g., the bit positions in the M3 column in the track table to an invalid state. A second ESTABLISH command performs the same function with respect to the LV4-M1 logical volume 110 and the DRV2 logical volume 116. In response to two ESTABLISH commands, a copy program in each of the device controllers, also called disk adapters, associated with the LV1-M1 logical volume 105 and the LV4-M1 logical volume 110, test their respective M3 track status bits. For each invalid bit, the copy program transfers the data in the corresponding track to the appropriate one of the DRV1 or DRV2 logical volumes 115 and 116. As will be apparent, the two ESTABLISH commands can issue essentially simultaneously and the transfer of data to the two DRV logical volumes occurs simultaneously.

Figure 8B:
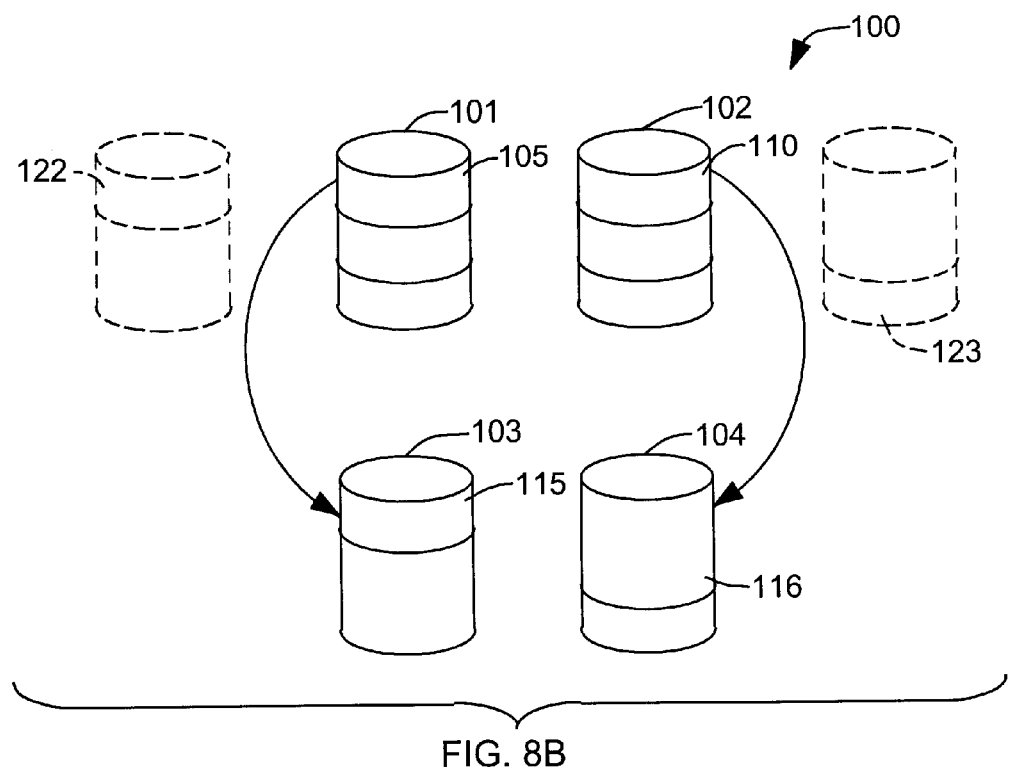

As with a BCV device, these transfers occur in parallel with and concurrently with any transfers of data from user or application software generated I/O requests to the LV1 and LV4 logical volumes. Thus the operation does not produce any interruption in the operation of user or application software utilizing the data in these logical volumes. FIG. 8B depicts these transfers in response to the ESTABLISH commands.

It will be apparent that through this process an original level of data redundancy for reliability remains the same. That is, in this embodiment in which the data in the LV1 logical volume is replicated in two mirrors, the data in LV1 logical volume remains replicated in the logical volumes 105 and 122 during the ESTABLISH process. Immediately upon reaching synchronism a third copy of the data exists in the DRV1 logical volume 115.

When synchronization does occur, step 143 transfers control to step 144 in FIG. 4B. Synchronization is an example of an event that enables the following steps beginning with 144 to proceed. Other events might also be used as complementary or additional tests to be performed at this point in the process.

Step 144 test various communication paths required to perform the exchange. This may include some host processor dependent operations or tests. Other tests will involve data located in the system manager 40 or in the various device controllers or disk adapters associated with the system. As indicated in the above-identified U.S. Letters patent application Ser. No. 09/396,146, communications among the system manager console 40 and the various disk adapters occur through mailboxes. Tests in step 144 also assure that the mailboxes are accurately assigned and that other processes necessary for effecting a reconfiguration are operating appropriately. Any problem encountered will, produce an error message, although generation of such an error message is not shown in FIG. 4B.

Figure 8C:
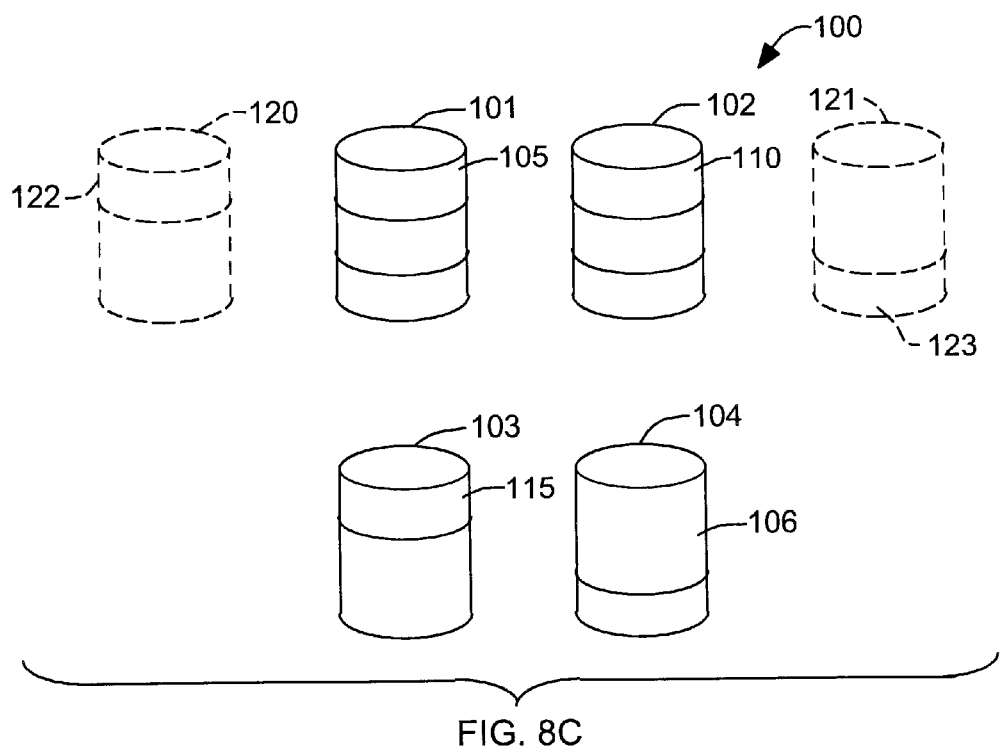

When all the foregoing tests are completed, step 145 sets the logical volumes corresponding to the LV1-M1 and LV4-M1 logical volumes to a Not Ready status as shown in FIG. 8C. As a result, write operations to the LV1 and LV4 logical volumes will be routed to the DRV1 and DRV2 volumes 115 and 116 respectively, but will not update data in the logical volumes 105 and 110. However, even with the logical volumes 105 and 110 being not ready, the original level of redundancy is maintained.

In the specific example, that portion of the physical disk storage device 101 represented by reference numeral 105 is configured as a new LV4-M1 logical volume and while the portion 110 on the physical disk storage device 102 is configured as a new LV1-M1 logical volume. Step 146 establishes this new configuration by loading the new configuration information into mailboxes for transfer to the various disk adapters or controllers.

Step 147 then disables any dynamic mirror service policy. In accordance with U.S. Letters Pat. No. 5,819,310 issued Oct. 6, 1998 and assigned to the same assignee as this invention, a dynamic mirror service policy determines how data may be read from different logical volumes. In a simple approach, data on a first number of tracks might be read from the LV1-M1 logical volume while the data on the other tracks might be read from the LV1-M2 logical volume 122 on the physical disk storage device 120. Step 147 disables this policy in order to avoid any conflicts that might otherwise arise should a change to the dynamic mirror service policy be attempted during the reconfiguration process.

Step 150 then loads the new configuration information and enables the dynamic mirror service policy. Step 151 sets all the bit positions in the corresponding ones of the M1-M4 columns of the track tables for the new LV1-M1 and new LV4-M1 logical volumes 105 and 106, respectively, to invalid states.

Figure 8D:
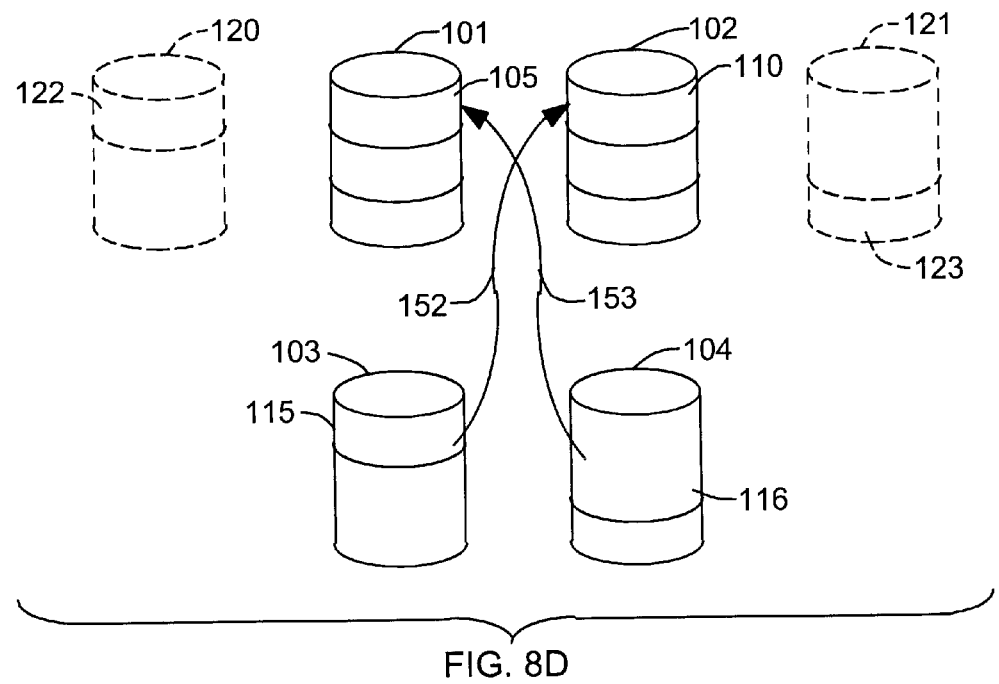

Now a copy program associated with the DRV1 logical volume 115 or the new LV1-M1 logical volume 110 transfers the data to the newly configured LV1-M1 logical volume 110 on the physical disk storage device 102 as represented by arrow 152 in FIG. 8D. Another copy program associated with the DRV2 logical volume 116 or new LV4-M1 logical volume 105 transfers the data to the newly configured LV4-M1 logical volume 105 on the physical disk storage device 101 as represented by the arrow 153.

Referring again to FIG. 4B, step 154 monitors these data transfers until all the data has been copied. When this occurs, there are again three copies of the data in each of the LV1 and LV4 logical volumes assuming there originally were two mirrors for this data.

Figure 8E:
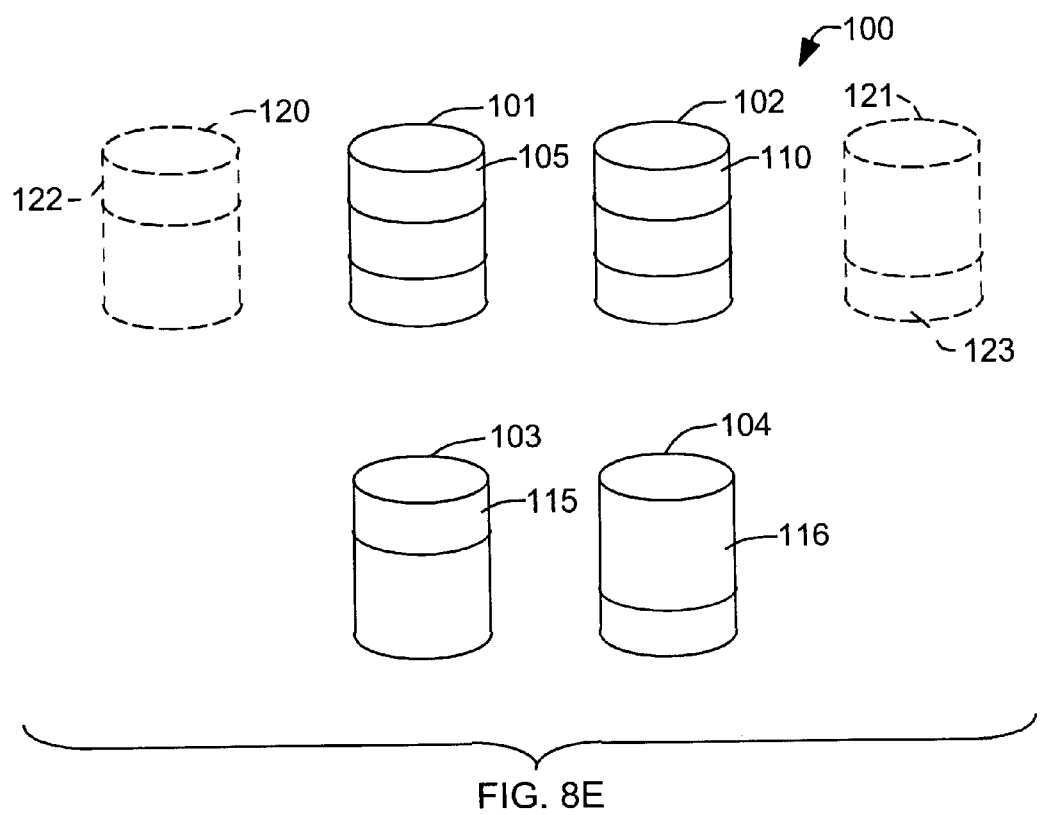

Step 155 then splits the DRV logical volumes so they are isolated from further responses to I/O requests from user or application generated software. With this step, and as shown in FIG. 8E, the data in M1 mirrors for the LV1 and LV4 logical volumes have been exchanged. The LV1-M1 logical volume data now resides in location 110 of physical disk storage device 102 while data in the LV4-M1 logical volume resides in the logical volume 105 of physical disk storage device 101. After the split occurs, step 156 removes the locks, particularly the locks applies during steps 131 and 132 so that the restrictions imposed by the process are released. All the operations involved with the exchange by the system manager console 40 then terminate.

Thus, the, procedure outlined in FIGS. 4A and 4B provides a means for exchanging data blocks in a very efficient manner by using DRV logical volumes as available buffer memories. Moreover, the exchange can be made with little or no impact on the operations of the data processing system. Still the procedures could be used to achieve the exchange of logical volumes attaining the exchange completely or partially independently of and transparent to host operations.

Figure 5B:
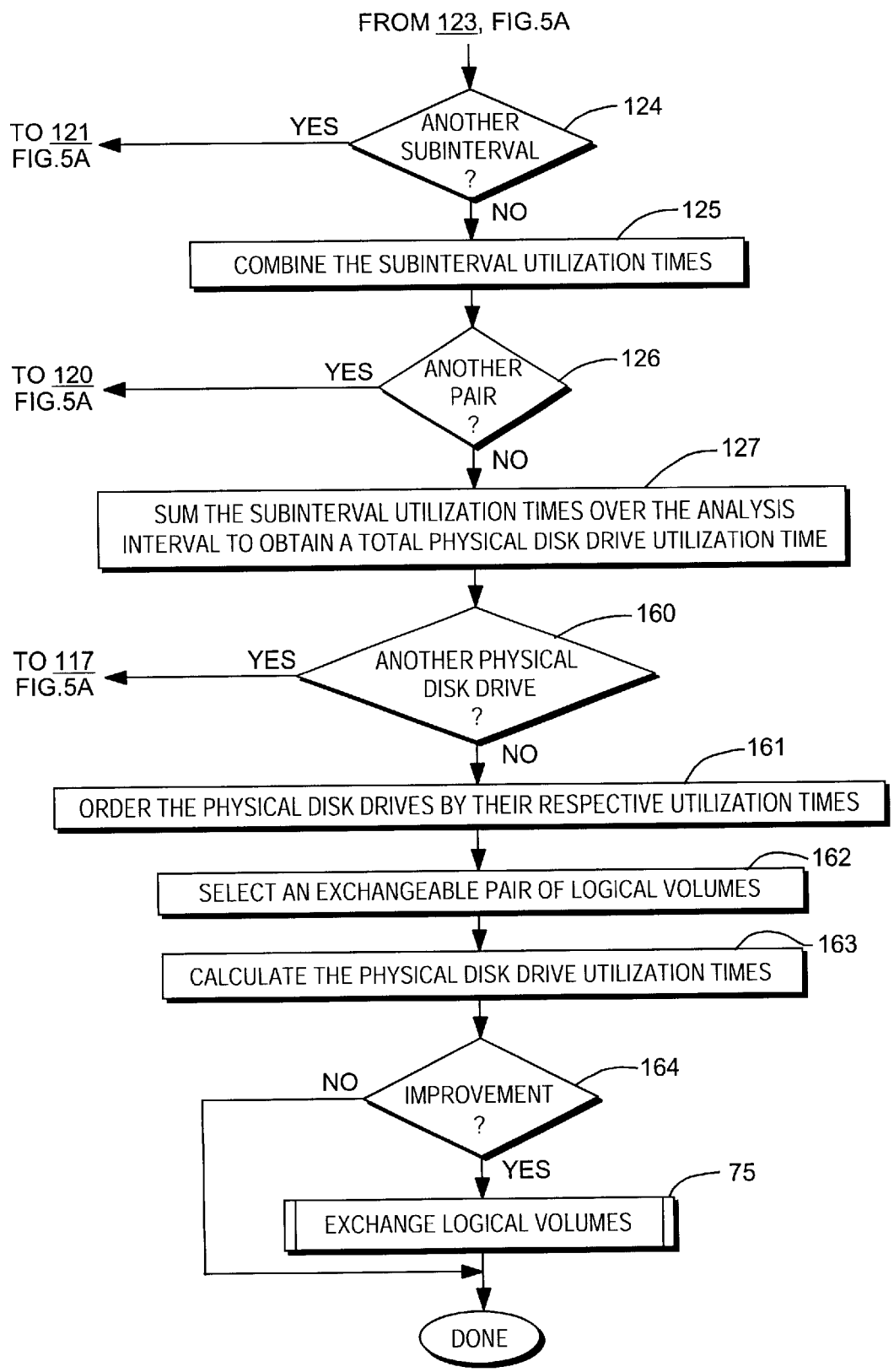

Steps 62 through 77 in FIGS. 2A and 2B depict a procedure for performing analysis based upon disk utilization for each exchangeable logical volume as determined by the total number of accesses to a physical disk drive and logical volumes that are the targets of I/O requests. FIGS. 5A and 5B depict a procedure for analyzing load balance using time-based disk utilization statistics as a criterion. This procedure has achieved improved results in many applications.

The analysis time interval for this procedure can be measured in terms of a few hours to days or weeks or longer. Subintervals can also be of arbitrary length ranging from a few minutes to an hour or more. As will become apparent, the duration of a subinterval is a tradeoff between the accuracy of sampling which is desired and the number of calculations that must be performed on the samples. The duration of the analysis time interval depends, in part, upon a time that provides some reasonable level of consistent performance. These can be generally selected with experience. An initial selection of an analysis time interval of one week and subintervals in the order of fifteen minutes has been found to be satisfactory in many applications.

Step 112 represents a conventional procedure by which the system selects a logical volume as a data block for analysis. The system then uses step 113 to count the number of disk accesses and segregate them into independent disk read, disk write and sequential pre-fetch read categories. These counting operations are upheld in each logical volume for each of the subintervals in the analysis time interval. It has been found that weighting this information can improve the overall result, particularly a weighting of 1.0 for independent disk reads, 0.5 for disk writes and 0.25 for sequential pre-fetch reads. Other weightings may also be effective.

The procedure of step 114 converts the weighted disk activity into disk transfer times representing the time to complete the transfer exclusive of any seek operations. That is, the disk transfer time will correspond to any latency time plus the time for transferring selected data. This conversion can be provided by arbitrary or experimental data contained in a table that may represent an average of all systems or specific systems by model and manufacturer. The data may be manufacturer's design data or may reflect specific measurements at one track on a physical disk drive or at a plurality of spaced tracks.

The data accumulated in steps 112 through 114 provides a good approximation of disk utilization values during each individual subinterval for each logical volume. These incremental or logical volume sub-interval utilization values can then be summed to obtain logical volume utilization values and disk utilization values for a physical disk storage device as described in conjunction with the rest of the steps of FIGS. 5A and 5B. Specifically, the disk accesses and other available information can be used to generate individual information about one or more different phases of any response to an input/output request to a disk array storage system including (1) a seek phase corresponding to the time that the read/write heads move from one position to another, (2) a wait phase corresponding to the interval between the receipt of a data transfer request as a physical disk storage device, (3) a data transfer phase corresponding to the time that the physical disk storage device transfers data and (4) a latency phase corresponding to the time between the end of the seek phase and the beginning of the data transfer phase. Information from any one or more of these operating phases can be used with the seek time to obtain a physical disk storage device utilization time.

When data about latency and data transfer phases is to be incorporated in the disk utilization values, the system will use operational data that a manufacturer supplies for its physical disk storage units, namely: rotational speed of the media on the spindle, that is defined as $\omega s$; and a data transfer rated $D_r$.

The data transfer rate, $D_r$, may be provided as a constant rate for all cylinders in the physical disk storage device. However, many disk manufacturers group adjacent tracks into Z concentric zones, z, i.e. $0 \leq z \leq (Z-1)$, each zone, z, having its own data transfer rate, $D_{r,z}$. In such devices the data transfer rate from the outermost zone will have the greatest value; the data transfer rate from the innermost zone, the lowest data transfer rate. Such information may be stored in the service processor 40 of FIG. 1 as a table having the following information:

| DISK INFORMATION TABLE Disk ID Rotational Speed (ωs) | | |
|---|---|---|
| Zone | Size (MBytes) | Data Transfer Rate (Mbytes/Sec.) |
| 0 | 2.4 | 19 |
| 1 | 2.2 | 16 |
| . | . | . |
| . | . | . |
| . | . | . |
| Z | 1 | 10 |

The service processor 40 of FIG. 1 could contain one such table for each type of physical disk storage device used in a disk array storage system. Most disk array storage systems include physical disk storage devices of a single type manufactured by a single manufacturer or at most a very limited number of manufacturers or types. Consequently any requirements for storing this information in the service processor 40 will be limited. Alternatively, the different values might also be stored as program constants or as constants derived from tables during an initialization procedure, as will be known to those of ordinary skill in the art.

As will become apparent, each of the procedures for generating each of the disk seek, latency and data transfer times and wait times will require service processor resources. Although it is anticipated that the generation of all four items will normally occur, limits on those resources or even the nature of the data accesses may require or permit a sufficiently accurate disk utilization time to be generated using any one or combination of the disk seek, latency, data transfer rate and wait times.

Figure 6:
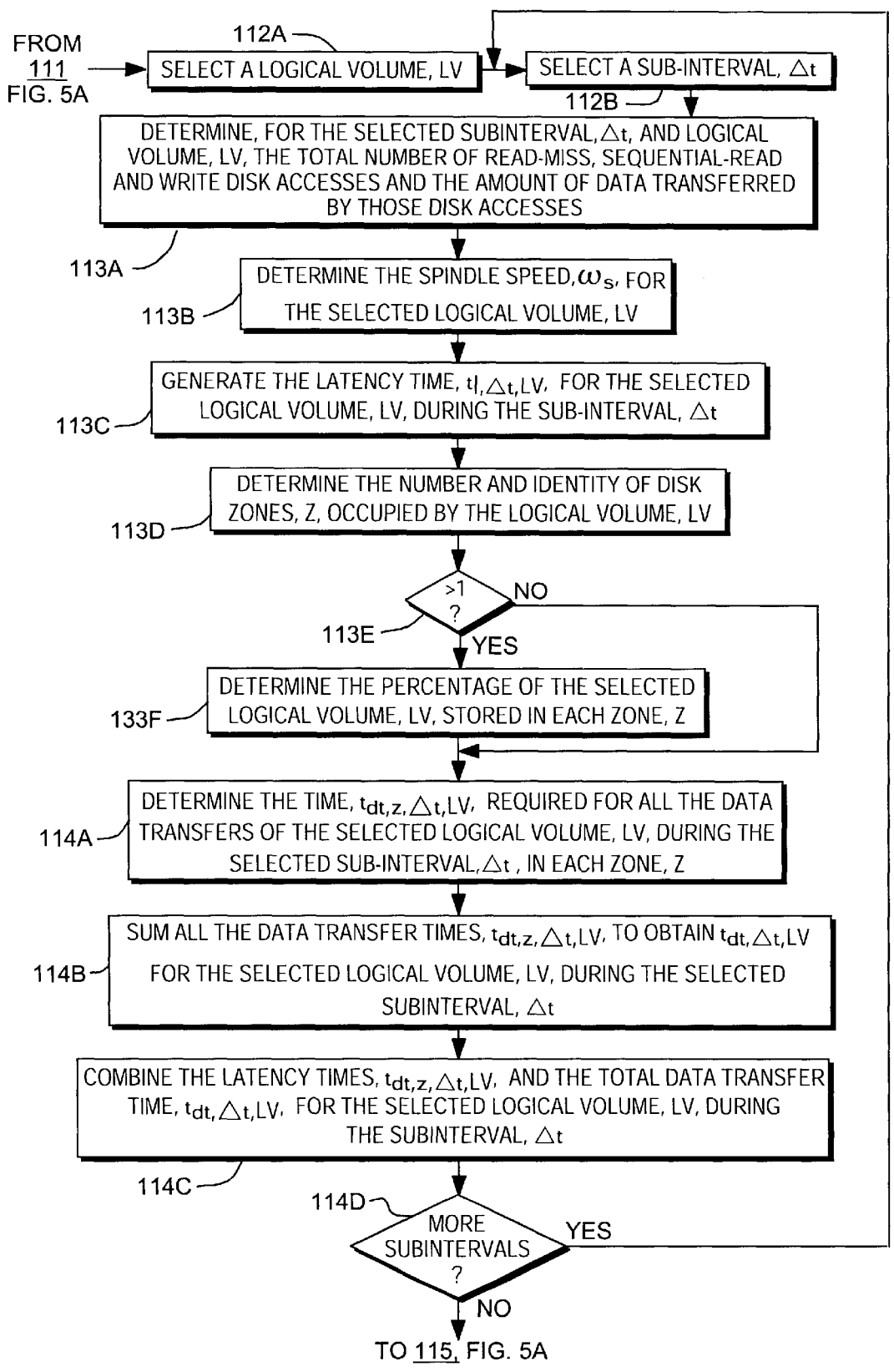
FIG. 6 constitutes a flow diagram that depicts another alternative procedure for identifying logical volumes to be exchanged.

FIG. 6 uses the reference numerals 112, 113 and 114 with letter suffices to more clearly delineate the correlation between the process shown in FIG. 6 and in FIG. 5A. For example, step 112 in FIG. 5A selects a logical volume in physical disk drive, step 112A selects a logical volume, LV, while step 112B selects a subinterval Δt. As will also become apparent, the procedure of FIG. 6 could also be positioned or included as an addition to steps 125 or 127 in FIG. 5B.

Latency Time

Like step 113 in FIG. 5A, step 113A in FIG. 6 determines, for a selected subinterval, $\Delta t$, and logical volume, LV, a total number of read miss, sequential-read and write disk accesses. In addition step 113A determines the amount of data transferred by those various disk accesses. As previously discussed, the number of disk accesses are weighted as previously described such that:

$$\text{Weighted Accesses} = N_{rm} + \frac{N_{wr}}{2} + \frac{N_{sr}}{4} \tag{2}$$

where $N_{rm}$ and $N_{wr}$ represent read-miss accesses and write accesses. $N_{sr}$ represents the number of sequential read access operations that occur during the subinterval. If the access activity in a subinterval includes 10 read miss accesses, 20 write accesses and 8 sequential read accesses, $N_{rm}=10$, $N_{wr}=20$, $N_{sr}=8$, and there will be a total of 38 accesses. However, according to Equation (2), the number of weighted accesses will be 22.

Step 113B retrieves the spindle speed, $\omega_s$, for the physical disk storage device that contains the logical volume be analyzed. Step 113C generates the latency time $t_{1,\Delta t,LV}$, for the selected logical volume during the subinterval according to:

$$t_{l,\Delta t,LV} = \frac{k}{\omega_x}(N_{rm} + N_{wr} + N_{sr}). \tag{3}$$

In the foregoing example with 38 accesses, the latency time is proportional to the number of accesses and inversely proportional to the spindle speed, $\omega_s$. In a preferred embodiment k=0.5 indicating that it is assumed that, on average, there will be one-half revolution of the media between the end of each seek operation and the beginning of a consequent data transfer.

Data Transfer Time

The second factor involved in this analysis is the sum of the times required to actually perform the data transfers in response to the data accesses to the logical volume during the subinterval. As previously indicated, most manufacturers today provide information about the data transfer rates broken down into different zones. Step 113D then defines the number and the identity of the disk zones, z, occupied by the logical volume, LV, under test. Conventional configuration information available will provide this correspondence. Specifically, if a physical disk storage device stores multiple logical volumes, the size of each logical volume is known and fixed. The order in which the logical volumes are stored on the disk is also known.

If a logical volume is stored within a single zone, then the data transfer rate for that logical volume will be constant at the data transfer rate for that zone. If, however, a logical volume spans multiple zones, step 113E transfers control to step 113F to determine the percentage or portion of the logical volume that lies in each zone. For example, if a 1 Mbyte logical volume included 200 Kbytes in zone 0 and 800 Kbytes in zone 1, the percentages would be 20% for zone 0 and 80% for zone 1.

Whether the logical volume occupies a single zone or multiple zones, control passes to step 114A to enable the system manager or service processor 40 to generate a time $t_{dt,z,\Delta t,LV}$, required for all the data transfers to have occurred with the selected logical volume during the selected subinterval in each zone according to:

$$t_{dt,z,\Delta t,LV} = \frac{|Data|}{D_{r,z}} \tag{4}$$

If the logical volume is incorporated in a single zone, then the Equation (4) provides the quotient of the total data transferred to and from the logical volume over the subinterval divided by the constant data rate for the entire logical volume. For multiple data zones, the transferred data is apportioned across the different zones according to the percentages of the logical volume in each zone. In the foregoing example, 20% of the accesses of the data written would be assigned to zone 0 and 80% to zone 1. Assume 200 Kbytes of data had been transferred. Using a disk having the characteristics according to the foregoing Disk Information Table, the data transfer time in seconds for the logical volume in the subinterval would be:

$$t_{dt,\Delta t,LV} = \frac{0.040}{19} + \frac{0.160}{16} \quad (5)$$

Steps 114A and 114B represent this process.

Step 114C then combines the latency times, $t_{1,\Delta t,LV}$, and the total data transfer time, $t_{dt,\Delta t,LV}$, for the selected logical volume, LV, during the subinterval $\Delta t$. If more subintervals are involved, step 114D returns control to step 112B. Otherwise control passes to step 115 in FIG. 5A.

Once this information has been generated for a particular logical volume or other data block by any of the foregoing methods, step 115 determines whether additional logical volumes exist that remain untested. If more logical volumes exist, control passes back to repeat steps 112 through 114.

Seek Time

After all the logical volumes have been processed to obtain the disk transfer times and latency times for each logical volume and each subinterval, step 115 diverts control to step 116. Step 116 begins an analysis that provides the seek times for the logical volumes. Specifically steps 116, 117 and 120 select, in order, a physical drive, a pair of logical volumes on that drive and a subinterval. For each subinterval step 121 converts the number of accesses to the selected pair of logical volumes is converted into a seek time T(seek)d for a given drive, d, segregated into N logical volumes according to:

$$T(seek)_d = \left[ \frac{\sum_{i \ne j} T_{i,j} * A_i * A_j}{\sum_{k=1}^{N} A_k} \right] \quad (6)$$

wherein $T_{ij}$ represents the seek time and $A_i$ and $A_j$ represent the respective weighted activities for each of two selected logical volumes for a given pair (i,j) of logical volumes on the disk drive d, wherein $1 \le i \le N$, $1 \le j \le N$, and $i <> j$, and wherein the sum of $A_k$ for all values of k, i.e., $1 \le k \le N$ represents the total number of weighted accesses to the physical disk storage device, d. Equation (6) thus provides a statistical representation of the number of seeks and seek time between the logical volumes i and j based upon the activity to each logical volume in that drive over the subinterval. The sum for all logical volume pairs on the physical disk drive represents the total amount of seek time conducted by the physical disk drive for the selected subinterval.

There are several ways to determine the seek time $T_{ij}$. In one approach a seek time table records the seek time between each pair of tracks for each type of drive. This seek time can be based upon manufacturer supplied data, sample measurements, in situ measurements or other procedures. Data based upon sample measurements has provided good results.

The monitor 50 will additionally contain in its configuration table a center-line track position of each logical volume on a physical disk drive. This information will provide, for any seek operation, the starting and ending tracks based upon the centerline track position. It has been found that the use of a centerline track position also provides good results. The starting and ending centerline tracks can then used as an entry into the seek time table information for the corresponding disk drive to obtain the $T_{ij}$ time for that specific disk drive. Thus, for a given pair of logical volumes, the seek time T(seek)d derived from Equation (6) provides a good statistical approximation the total seek time involved for the specified pair of logical volumes during the subinterval.

In many applications the time and other resources required for the system manager to calculate the disk seek times for various volumes can be individually long or burdensome. An alternate approach has been found that also provides an acceptable seek time value but with a significantly reduced burden on the resources of the system manager 40. As described ion the above-identified U.S. Letters patent application Ser. No. 09/382,752, another seek-time function, New $T(seek)_d$, is given by:

$$NewT(seek)_d = \frac{\sum_{i=1}^{N} \sum_{j=1}^{N} A_i * A_j |i - j|}{\sum_{k=1}^{N} A_k} \quad (7)$$

An analysis of Equations (6) and (7) shows that Equation (7) provides an acceptable disk seek value. As will now be shown, equation (7) can be manipulated to provide a very simple solution that greatly reduces the burden on the resources for determining seek times. In some applications, this procedure has provided an 8:1 reduction in the time required to obtain the seek times. As will be apparent, such a reduction in the burden is highly desirable.

Specifically, if the sum of activities, $A'_i$, for each logical volume is computed as:

$$A'_i = A_1 + A_2 + \ldots + A_i \quad (8)$$

Substituting Equation (8) in Equation (7) and manipulating the terms yields another value for disk seek time, New T(seek), that is given by:

$$NewT(seek) = \sum_{i=1}^{N} A'_i - \frac{\sum_{i=1}^{N} A'^2_i}{A'_N} \quad (9)$$

where $A'_i$ is the sum of the activities for all the logical volumes; that is:

$$A_N = A_1 + A_2 + \ldots A_N \quad (10)$$

Figure 7:
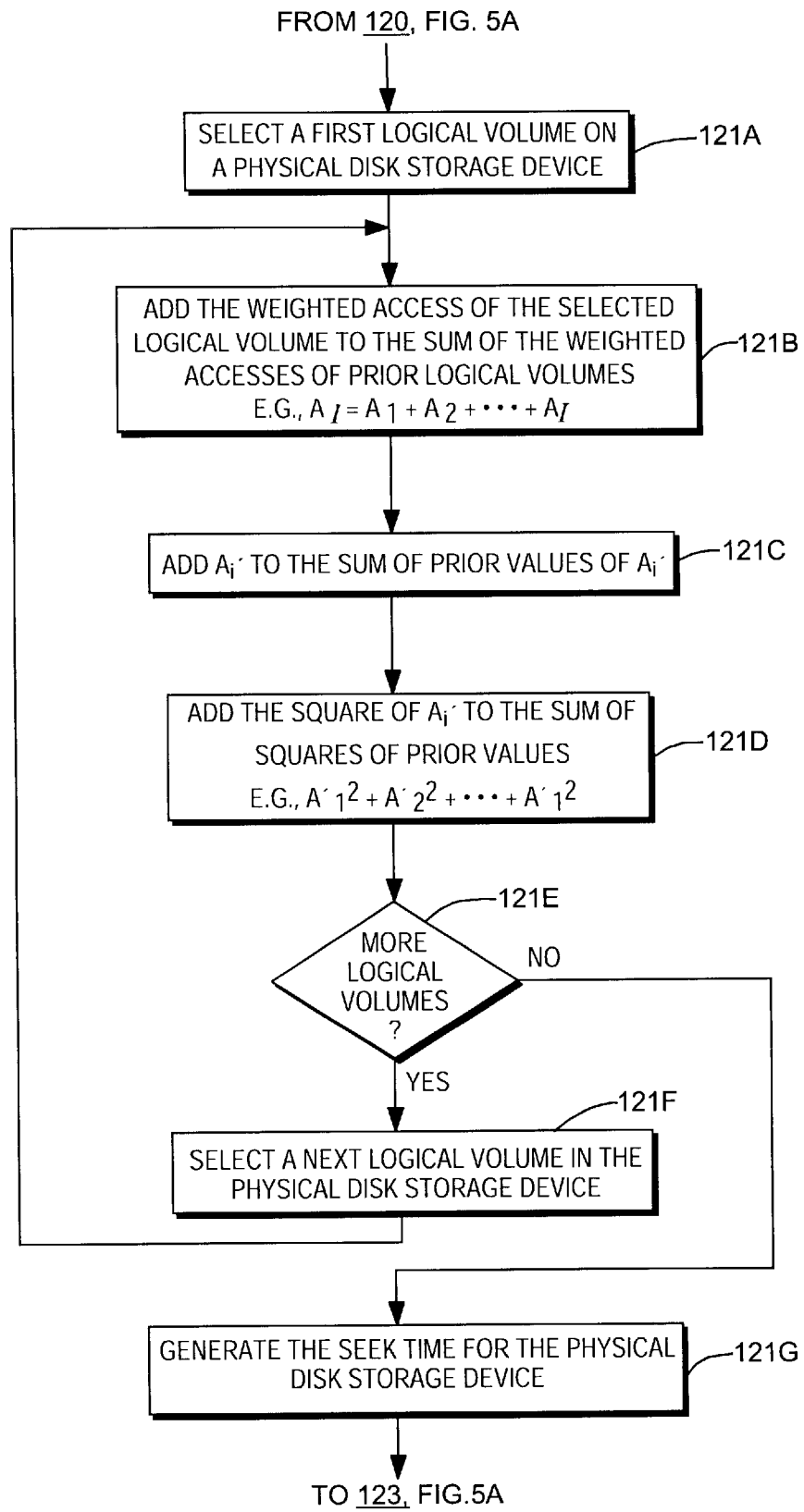
FIG. 7 constitutes a flow diagram that depicts an alternate procedure for obtaining a disk operating characteristic in accordance with this invention.

FIG. 7 depicts a method for determining disk seek times using equations (9) and (10) that can replace the procedure or step 121 in FIG. 5B. Consequently, FIG. 7 uses reference numeral 121 with a letter suffices to designate the specific steps.

When control passes from step 120 in FIG. 5B to the procedure in FIG. 7, step 121A selects a first logical volume on a physical disk storage device to be analyzed.

Step 121B then adds the weighted accesses of the selected logical volume to the sum of the weighted accesses of prior logical volumes. During the analysis of the first logical volume, the sum of the weighted accesses of prior logical volumes, as apparent will be 0. For successive logical volumes step 121B produces a value for the variable $A'_i = A_1 + \ldots + A_i$.

Step 121C then sums the weighted access with the sum of the prior values of the summed weighted access. After processing tie first logical volume, step 121C produces a value of $(A'_1 + A'_2 + \ldots + A'_i)$.

Step 121D then adds the square of $A'_i$ to the sum of the squares of previous values of $A'_i$. That is, step 121D provides a value of $[(A'_1)^2 + (A'_2)^2 + \ldots + (A'_i)^2]$.

If there are more logical volumes step 121E transfers control to step 121F whereupon a next logical volume is selected. In a specific implementation with systems supplied by the assignee of this invention, the selection process is orderly. Specifically, each physical disk storage device stores its logical volumes at assigned positions. The first selected logical volume in step 121A should be the first logical volume on the physical disk storage device. Step 121F should select the second through Nth logical volumes in the same order.

After step 121F makes a selection, control passes back to step 121B. This loop continues until all the logical volumes have been processed. Then step 121E transfers control to step 121G to generate the seek time for the physical disk storage device according to Equation (9) to compute the New T(seek)$_d$. More specifically, the value $A_N$ obtained in step 121B becomes the denominator in the right-hand term Equation (9); the value obtained in step 121D, the numerator of that right-hand term. Step 121B provides the value for the left-hand term. Stated differently, Equation (9) becomes:

$$NewT(seek) = Value\ from\ 121D - \frac{Value\ from\ 121B}{Value\ from\ 121C} \quad (11)$$

As will now be apparent, the direct solution of either equation (6) or (7) requires a procedure that uses an outer calculation loop for various values of i and an inner calculation loop for various values of j; i.e., a two-loop solution. The time required to perform such calculations will then increase approximately as the square of the number of logical volumes in a physical disk storage device. Equation (9) when implemented according to FIG. 7 provides the result of Equation (11) with only one loop. Consequently the time required to obtain the representation of disk seek activity will increase approximately as the number of logical volumes and, therefore, will be reduced significantly over the time required to obtain the value with a two-loop solution. A comparison involving a physical disk drive with eighteen logical volumes demonstrated that the single-loop solution provided a result in ⅛ of the time required to produce the result with the two-loop solution.

Wait Time

Wait time is dependent upon other information available from the monitor 50 in FIG. 1. As previously indicated, wait time is the time that expires between the arrival of an I/O request at a disk adapter or controller, and the beginning of a seek. It is another factor that can be indicative of uneven loading among different physical disk storage devices in a disk array storage system. That is, if one physical disk storage device is severely loaded, that device will begin to introduce delays between the arrival of a disk read or write request and the initiation of an actual transfer in response to a read or write request. There are several known approaches for predicting such wait time as a function of the number of accesses or requests to determine the magnitude of utilization of the physical disk storage device and the average "wait time". Thus, in some systems in may be advantageous to use such "wait time" in determining the disk utilization as a complement to the previously described disk seek, latency and data transfer times or some combination of those times.

Step 123 then combines the seek time, however obtained, the disk transfer times and to obtain a logical volume subinterval utilization time that represents the total time that a physical disk operates in performing transfers including any or all of the seek, latency, data transfer and wait times associated with that activity.

Step 124 in FIG. 5B determines whether all the subintervals have been processed. If more subintervals exist for the selected pair of logical volumes, step 124 branches back to step 120 to repeat the process of steps 120 and 123. When the subinterval utilization times have been obtained for all the subintervals, step 125 combines or sums the times to obtain logical volume utilization times. Step 126 then determines whether additional pairs of logical volumes exist on the physical disk drive selected in step 116. If another pair of logical volumes exists, control passes back to step 117 to obtain the combined or physical disk storage device utilization time.

After all the utilization times for different physical disk drives ha e been obtained and summed, step 126 transfers control to step 127, thereby to sum the interval utilization times over the entire interval to obtain total physical disk drive time-based utilization statistics for that particular physical disk drive. Step 130 then determines whether additional physical drives need to be tested and branches back to step 116 to select another physical drive if needed.

After all the physical drives have been analyzed, control passes from step 160 to step 161 in which the physical disk drives are ordered by their respective time-based utilization statistics. In step 162 an exchangeable pair of logical volumes is selected. This selection process can be achieved in many ways. A simple approach is merely to define an exchangeable pair in which one of the pair is the busiest logical volume in the physical disk drive with the highest time-based utilization statistics and the second is the least busy logical volume on the physical disk drive having the lowest time-based utilization statistics. The philosophy is that if the busiest logical volume on the busiest physical drive is exchanged for the least busy volume on the least busy drive improved load balancing will be achieved.

Step 163 represents the procedure by which the previous process of steps 112 through 127, 160 and 16 are repeated using the information from the proposed exchange disk drives. That is, in the particular example described above, the analysis would be revised by examining physical disk drives 31a and 31b to recalculate their various parameters assuming the LVE logical volume is exchanged with the M1-LVA logical volume. If an improvement seems likely, step 134 branches to step 75 representing a process for exchanging logical volumes. If not, the analysis ends without making any exchange.

Calibration Procedure

Each of the foregoing factors of disk seek, latency, data transfer and wait time characteristics, when used singly or in some combination provide an ultimate disk utilization value for predicting the effect of a swap or multiple swaps. As each value is the result of a statistical analysis, it is possible that the predicted and actual results will not match, even assuming that there is no appreciable difference in the load imposed on d different individual logical volumes during operations after a swap occurs.

However, in some cases it may be helpful to calibrate the utilization values based upon various other factors thereby to reduce any deviation between future predicted and resultant disk utilization values. For example, during the process described with respect to FIG. 2B, step 74 compares the anticipated physical disk access activity before and after the proposed exchange. Let the anticipated physical disk access activity after the proposed change be a "predicted value" and assume that the exchange is made. As will be apparent, statistics will continue to be gathered after the exchange is made. At some point, those statistics could be analyzed to determine an "actual value". These two values could then be combined to produce a calibration factor (CF) as follows:

$$CF = \frac{Actual\ Value}{Predicted\ Value} \quad (12)$$

As previously stated, it is assumed that operating conditions do not change materially when an exchange is made. In many situations that assumption may be incorrect. Such values of CF might then be accumulated over time to obtain a statistically significant value which then could be used to modify the distribution values prior to the selection of an exchangeable pair.

A second example could compare the certain information about the disk seek number obtained in Equation (7). Some monitors, such as the monitor 50, may include components to measure the number of logical volumes traversed by the read/write heads of a physical disk storage device during each seek operation. If such a parameter is available, this parameter and a corresponding parameter obtained by using the weighted disk accesses in Equation (7) could be compared. Let $N(s)_d$ be the total number of logical volumes as provided by the monitor 50 for a physical disk storage device, d, and $N(p)_d$ be the number of accesses predicted by Equation (7) for that same device. An another calibration factor for the number of accesses, $CA_d$, could then be obtained for that physical disk storage device according to:

$$CA_d = \frac{N_s}{N_p} \quad (13)$$

This factor, $CA_d$, would then be applied to the predicted values for each logical volume in the physical disk storage device. Different factors could then be obtained for each physical disk storage device. Such factors could then be used as singular values based upon one set of measurements or as an average or statistically generated value.

The forgoing analysis is described with a single selected exchangeable pair being analyzed. It will be also apparent that it may be advantageous to examine the changes in relative physical disk loading balance looking at the various combinations that could exist among all the exchangeable logical volumes pair taken one pair at a time. Typically, however, this will require such significant processing time as to become impractical. As still another alternative, a preset number of exchangeable pairs could be evaluated in order to limit the amount of time required to make a determination of whether an exchange would be beneficial.

Alternatives

The foregoing disclosure describes a number of approaches for balancing loads in a disk array storage device using various tests and exchange procedures. In each case, it is assumed that a single analysis is being performed and that various steps might be produced independently and under manual control. That is, an operator might start the analysis and obtain a report suggesting logical volumes to be exchanged. Then the operator could take the necessary steps to effect the exchange. As will be apparent, however, it is also contemplated and within the capabilities of persons of ordinary skill in the art to effect an automatic process by which the duration and number of time subintervals are selected and the tests to be conducted are selected and by which the process then initiates and completes automatically.

For example, it is also possible to operate with time intervals that are different in length and that overlap. For example, an operator can select to use a first time, e.g., a 15-minute time interval that begins each hour and a second, one-day time interval. The operator could also select or could be provided with a predetermined analysis involving just the seek time, or some other time, for analyzing operational data obtained during the first time intervals. Then the operator might select from the full list of alternatives, a process to be conducted at the end of each second time interval. Both of these processes might operate in a semi-automatic mode, whereby the operator might obtain the recommendations for a swap and then initiate the swap. Both these processes could also be operated fully automatically. In still other environments, the first time interval process might operate automatically while the second time interval process might operate semi-automatically or manually. In any of these variations, the exchanges obtained during the first time intervals would be short-term changes; those obtained during the second time intervals, long-term changes.

Summary

In summary, this application defines a general methodology by which it becomes possible to balance loads on individual physical disk storage devices in order to improve system performance. The method depends, in large part, upon the accuracy with which the measured parameters are converted statistically into disk utilization values for each physical disk storage device. The foregoing description defines a number of factors. These include disk seek time, disk latency time, disk transfer time and disk wait time. As previously indicated, an individual analysis may incorporate any one or all of these or even other factors. Typically an initial analysis will be made using one or two factors, such as the disk seek time factor and one other factor. Additional factors may be added if the improvement in the accuracy of the predictions offsets the added burden on the service processor or system manager console 40. Thus, it is anticipated that in some applications, an analysis incorporating only one or two factors will provide sufficiently accurate information while in others it may be necessary to perform the analysis using all or essentially all of the factors together.

Similarly, two different calibration factors have been disclosed. It is possible that in some applications, no such factor will be required while in others one or more of calibration factors will provide a significantly improved accuracy.

Thus, in accordance with this invention, there is provided to a system operator an armamentarium of tools for analyzing disk operations. Moreover, this invention provides a system operator with great flexibility for selecting various tools from this armamentarium as required for different situations.

The foregoing description discusses this invention in terms of data organized into blocks of contiguous storage locations on a physical disk storage device of known size called logical volumes. However, the invention is applicable to other data organizations. In some applications, for example, a logical volume might be divided into a series of sub-volumes distributed across plural physical disk storage devices. Such a division could be made for redundancy and recovery purposes or for load distribution purposes. Each block, whether a logical volume, sub-volume or other grouping, constitutes a block of contiguous storage locations of a predetermined size. Conversely and consequently, a block then can be a single logical volume, sub-volume or other grouping.

The invention as previously described, is equally applicable to such systems. That is, the method operates with any blocks of contiguous storage locations, be they organized as logical volumes, sub-volumes or other groupings. In essence and in accordance with any of the foregoing embodiments of this invention, various read and write statistics are accumulated for each block over a time interval. A list of all pairs of exchangeable blocks are established using the previously described size and other criteria that correspond to the criteria discussed in connection with step 63 in FIG. 2A. If a logical volume is divided into sub-volumes for redundancy, an additional criteria could prevent sub-volumes from the same logical volume from residing on one physical disk storage device. The configuration to be established is then evaluated in the same manner as the configuration is evaluated for an array divided into logical volumes, except for the evaluation being based on individual blocks. Assuming the configuration will provide better performance, the exchange is made in a manner that is analogous to the exchange in step 76 of FIG. 2B in accordance with the exchange procedure of FIG. 4.

It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for balancing loads on physical disk storage devices in a disk array storage device wherein at least two physical disk storage devices store data in a plurality of logical volumes and each physical disk storage device responds to a data transfer request to read or write data in a series of operating phases, said method comprising the steps of:
   A) generating operational data including the number of accesses to each logical volume on predetermined ones of the physical disk storage devices in response to data transfer requests by
      i) defining a test interval comprising at least one test sub-interval, and
      ii) assigning each item of operational data to a sub-interval,
   B) converting the operational data into disk utilization values for each predetermined physical disk storage device and each logical volume in the predetermined physical disk storage devices by
      i) generating logical volume-phase disk utilization values for each operating phase, sub-interval and logical volume, and
      ii) combining the logical volume-phase disk utilization values to obtain the disk utilization value for the logical volume and sub-interval,
   C) analyzing the disk utilization values to select a pair of logical volumes that, if exchanged, would improve load balance for the predetermined physical storage devices, and
   D) exchanging the selected logical volumes.

2. A method as recited in claim 1 wherein said step of converting the operational data into disk utilization values includes the steps of:
   A) converting operational data for each logical volume and each sub-interval into logical volume-sub-interval utilization values,
   B) combining the logical volume-sub-interval utilization values over the test interval to generate logical volume data utilization values, and
   C) combining the logical volume data utilization values for each logical volume on a physical disk storage device to obtain the disk utilization values for each physical disk storage device.

3. A method as recited in claim 1 wherein each physical disk storage device includes movable read/write heads and the disk operating phases include a seek phase corresponding to the time that the read/write heads move from one position to another, a wait phase corresponding to the interval between the receipt of a data transfer request at a physical disk storage device and the initiation of the seek phase, a data transfer phase corresponding to the time that the physical disk storage device transfers data and a latency phase during corresponding to the time between the end of the seek phase and the beginning of the data transfer phase, said generation of operational data including the selection of other information relative to the selected ones of the operating phases.

4. A method as recited in claim 3 wherein said step of converting the selected operational data into disk utilization values includes the steps of:
   i) converting selected operational data for each logical volume and each sub-interval into logical volume-sub-interval operating phase utilization values for each of the selected phases,
   ii) combining the logical volume-sub-interval phase utilization values over the test interval to generate logical volume phase data utilization values,
   iii) combining the logical volume phase data utilization values for each logical volume on a physical disk storage device to obtain logical volume data utilization values, and
   iv) combining the logical volume data utilization values for each logical volume on a physical disk storage device to obtain the disk utilization values for each physical disk storage device.

5. A method as recited in claim 4 wherein said disk utilization value analysis includes the steps of:
   i) ordering the physical disk storage devices by disk utilization values,
   ii) identifying a list of logical volumes that can be exchanged, and
   iii) selecting a pair of logical volumes from the list for an exchange.

6. A method as recited in claim 5 wherein one of the logical volumes is selected from a physical disk storage device exhibiting a high disk utilization value and the other of the logical volumes is selected from a physical disk storage device exhibiting a low disk utilization value.

7. A method as recited in claim 5 additionally comprising the step of pretesting the selected logical volumes using said conversion and analysis steps to predict the operation of the disk array storage device after an exchange is made.

8. A method as recited in claim 3 wherein said generation of operational data includes the steps of:
   i) classifying the accesses into types, and
   ii) weighting the accesses according to type,
   iii) combining the weighted accesses for each type to obtain operational data for the logical volume during a sub-interval.

9. A method as recited in claim 8 wherein said conversion of the operational data for each sub-interval includes the step of generating a statistical value dependent upon the number of weighted accesses to each logical volume to obtain the total seek phase time for each physical disk storage device.

10. A method as recited in claim 8 wherein said conversion of the operational data for each sub-interval includes the step of generating a statistical value dependent upon the number of weighted accesses to each logical volume to obtain the total latency phase time for each physical disk storage device.

11. A method as recited in claim 8 wherein the operational data includes the amount of data transferred in response to the each data transfer request and the rate at which a physical disk storage device transfers data, said conversion of the operational data for each sub-interval includes the step of generating a disk transfer phase time representing the time required to transfer the data in response to the received data transfer requests.

12. A method as recited in claim 8 wherein said conversion of the operational data for each sub-interval includes the step of generating a statistical value dependent upon the number of weighted accesses to each logical volume to obtain the total wait phase time for each physical disk storage device.

13. A method as recited in claim 1 wherein said disk utilization value analysis includes the steps of:
 i) ordering the physical disk storage devices by disk utilization values,
 ii) identifying a list of logical volumes that can be exchanged, and
 iii) selecting a pair of logical volumes from the list for an exchange.

14. A method as recited in claim 13 wherein one of the logical volumes is selected from a physical disk storage device exhibiting a high disk utilization value and the other of the logical volumes is selected from a physical disk storage device exhibiting a low disk utilization value.

15. A method as recited in claim 13 additionally comprising the step of pretesting the selected logical volumes using said conversion and analysis steps to predict the operation of the disk array storage device after an exchange is made.

16. A method as recited in claim 15 additionally comprising the step of comparing the predicted operation and the operation of the disk storage device based upon said generation, conversion and analysis steps to generate a correction factor for use in subsequent analyses.

17. A method as recited in claim 1 additionally comprising the step of comparing the predicted operation and the operation of the disk storage device based upon said generation, conversion and analysis steps to generate a correction factor for use in subsequent analyses.

18. A method for balancing loads on physical disk storage devices in a disk array storage device wherein at least two physical disk storage devices store data in a plurality of logical volumes and each physical disk storage device responds to a data transfer request to read or write data, said method comprising the steps of:
 A) defining the length of a first analysis interval and a second analysis interval that includes a plurality of first analysis intervals,
 B) generating, for each of the first and second analysis intervals, operational data including the number of accesses to each logical volume on predetermined ones of the physical disk storage devices in response to data transfer requests,
 C) exchanging the data in a pair of logical volumes upon the completion of each first analysis interval in response to the processing of predetermined operational data during each first analysis interval, and
 E) exchanging the data in a pair of logical volumes upon the completion of each second analysis interval.

19. A method as recited in claim 18 wherein said step of exchanging a pair of logical volumes upon the completion of a second analysis interval includes:
 i) selecting processing to be used and the operational data required for such processing with respect to the second analysis interval,
 ii) defining logical volumes to be exchanged based upon the selected processing of the corresponding operational data.

20. A method for balancing loads on physical disk storage devices in a disk array storage device in response to data transfer requests to read or write data in a series of operating phases, wherein at least one physical disk storage device stores data in a plurality of logical volumes, said method comprising the steps of:
 A) generating operational data including the number of accesses to each logical volume in response to data transfer requests by
  i) defining a test interval comprising at least one test sub-interval, and
  ii) assigning each item of operational data to a sub-interval,
 B) converting the operational data into disk utilization values for each logical volume by
  i) generating logical volume-phase disk utilization values for each operating phase, sub-interval and logical volume, and
  ii) combining the logical volume-phase disk utilization values to obtain a disk utilization value for the logical volume and sub-interval,
 C) analyzing the disk utilization values to select a logical volume that, if moved from its physical disk storage device, would improve load balance, and
 D) moving the selected logical volume.

21. A method as recited in claim 20 wherein said step of converting the operational data into disk utilization values includes the steps of:
 A) converting operational data for each logical volume and each sub-interval into logical volume-sub-interval utilization values,
 B) combining the logical volume-sub-interval utilization values over the test interval to generate logical volume data utilization values, and
 C) combining the logical volume data utilization values for each logical volume on a physical disk storage device to obtain the disk utilization values for each physical disk storage device.

22. A method as recited in claim 20 wherein each physical disk storage device includes movable read/write heads and the disk operating phases include a seek phase corresponding to the time that the read/write heads move from one position to another, a wait phase corresponding to the interval between the receipt of a data transfer request at a physical disk storage device and the initiation of the seek phase, a data transfer phase corresponding to the time that the physical disk storage device transfers data and a latency phase during corresponding to the time between the end of the seek phase and the beginning of the data transfer phase, said generation of operational data including the selection of other information relative to the selected ones of the operating phase.

23. A method as recited in claim 22 wherein said step of converting the selected operational data into disk utilization values includes the steps of:
   i) converting selected operational data for each logical volume and each sub-interval into logical volume-sub-interval operating phase utilization values for each of the selected phases,
   ii) combining the logical volume-sub-interval phase utilization values over the test interval to generate logical volume phase data utilization values,
   iii) combining the logical volume phase data utilization values for each logical volume on a physical disk storage device to obtain logical volume data utilization values, and
   iv) combining the logical volume data utilization values for each logical volume on a physical disk storage device to obtain the disk utilization values for each physical disk storage device.

24. A method as recited in claim 23 wherein said disk utilization value analysis the steps of:
   i) ordering the physical disk storage devices by disk utilization values, and
   ii) identifying a list of logical volumes that can be moved, and
   iii) selecting a logical volume from the list for a move.

25. A method as recited in claim 24 additionally comprising the step of pretesting the selected logical volume using said conversion and analysis steps to predict the operation of the disk array storage device after the logical volume is moved.

26. A method as recited in claim 22 wherein said generation of operational data includes the steps of:
   i) classifying the accesses into types, and
   ii) weighting the accesses according to type,
   iii) combining the weighted accesses for each type to obtain operational data for the logical volume during a sub-interval.

27. A method as recited in claim 26 wherein said conversion of the operational data for each sub-interval includes the step of generating a statistical value dependent upon the number of weighted accesses to each logical volume to obtain the total seek phase time for each physical disk storage device.

28. A method as recited in claim 26 wherein said conversion of the operational data for each sub-interval includes the step of generating a statistical value dependent upon the number of weighted accesses to each logical volume to obtain the total latency phase time for each physical disk storage device.

29. A method as recited in claim 26 wherein the operational data includes the amount of data transferred in response to the each data transfer request and the rate at which a physical disk storage device transfers data, said conversion of the operational data for each sub-interval includes the step of generating a disk transfer phase time representing the time required to transfer the data in response to the received data transfer requests.

30. A method as recited in claim 26 wherein said conversion of the operational data for each sub-interval includes the step of generating a statistical value dependent upon the number of weighted accesses to each logical volume to obtain the total wait phase time for each physical disk storage device.

31. A method as recited in claim 20 wherein said disk utilization value analysis includes the steps of:
   i) ordering the physical disk storage devices by disk utilization values,
   ii) identifying a list of logical volumes that can be moved, and
   iii) selecting a logical volume from the list for a move.

32. A method as recited in claim 31 additionally comprising the step of pretesting the selected logical volume using said conversion and analysis steps to predict the operation of the disk array storage device after the logical volume is moved.

33. A method as recited in claim 32 additionally comprising the step of comparing the predicted operation and the operation of the disk storage device based upon said generation, conversion and analysis steps to generate a correction factor for use in subsequent analyses.

34. A method as recited in claim 20 additionally comprising the step of comparing the predicted operation and the operation of the disk storage device based upon said generation, conversion and analysis steps to generate a correction factor for use in subsequent analyses.

* * * * *